(12) United States Patent
Mathy et al.

(10) Patent No.: US 10,841,491 B2
(45) Date of Patent: Nov. 17, 2020

(54) REDUCING POWER CONSUMPTION FOR TIME-OF-FLIGHT DEPTH IMAGING

(71) Applicant: Analog Devices, Inc., Norwood, MA (US)

(72) Inventors: Charles Mathy, Somerville, MA (US); Sefa Demirtas, Malden, MA (US); Bin Huo, Wayland, MA (US); Dhruvesh Gajaria, North Reading, MA (US); Jonathan Ari Goldberg, Lexington, MA (US); Nicolas Le Dortz, Cambridge, MA (US); Tao Yu, Cambridge, MA (US); James Noraky, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 334 days.

(21) Appl. No.: 15/458,536

(22) Filed: Mar. 14, 2017

(65) Prior Publication Data

US 2017/0272651 A1 Sep. 21, 2017

Related U.S. Application Data

(60) Provisional application No. 62/398,519, filed on Sep. 23, 2016, provisional application No. 62/361,488, (Continued)

(51) Int. Cl.
*H04N 5/232* (2006.01)
*H04N 13/128* (2018.01)
(Continued)

(52) U.S. Cl.
CPC ....... *H04N 5/23241* (2013.01); *G01S 7/4868* (2013.01); *G01S 17/10* (2013.01);
(Continued)

(58) Field of Classification Search
CPC ....... H04N 13/271; H04N 13/25; H04N 19/51
See application file for complete search history.

(56) References Cited

U.S. PATENT DOCUMENTS 6,496,598 B1 * 12/2002 Harman ............... H04N 13/261
382/154
8,587,583 B2 11/2013 Newcombe et al.
(Continued)

FOREIGN PATENT DOCUMENTS

CN 102014293 4/2011
CN 102385237 3/2012
(Continued)

OTHER PUBLICATIONS

Achuta Kadambi et al., *Polarized 3D: High-Quality Depth Sensing with Polarization Cues*, MIT Media Lab, Int'l Conf. on Computer Vision (ICCV) Technical paper submission, 2015, http://web.media.mit.edu/~achoo/polar3D, 9 pages.
(Continued)

*Primary Examiner* — Pankaj Kumar
*Assistant Examiner* — Timothy R Newlin
(74) *Attorney, Agent, or Firm* — Patent Capital Group

(57) ABSTRACT

Aspects of the embodiments are directed to passive depth determination. Initially, a high power depth map of a scene can be created. An object in the scene can be identified, such as a rigid body or other object or portion of an object. A series of lower power or RGB images can be captured. The object can be located in one or more of the lower power or RGB images. A change in the position of an object, represented by a set of pixels, can be determined. From the change in position of the object, a new depth of the object can be extrapolated. The extrapolated depth of the object can be used to update the high power depth map.

29 Claims, 24 Drawing Sheets

Related U.S. Application Data filed on Jul. 12, 2016, provisional application No. 62/309,421, filed on Mar. 16, 2016.

(51) Int. Cl.

| | | |
|---|---|---|
| *H04N 13/257* | (2018.01) | |
| *H04N 13/296* | (2018.01) | |
| *H04N 5/222* | (2006.01) | |
| *H04N 5/225* | (2006.01) | |
| *G01S 7/486* | (2020.01) | |
| *G01S 17/10* | (2020.01) | |
| *G01S 17/89* | (2020.01) | |
| *G01S 17/86* | (2020.01) | |
| *H04N 13/122* | (2018.01) | |
| *H04N 13/254* | (2018.01) | |
| *H04N 13/271* | (2018.01) | |

(52) U.S. Cl.
CPC ............ *G01S 17/86* (2020.01); *G01S 17/89* (2013.01); *H04N 5/2226* (2013.01); *H04N 5/2256* (2013.01); *H04N 13/122* (2018.05); *H04N 13/128* (2018.05); *H04N 13/257* (2018.05); *H04N 13/296* (2018.05); *H04N 13/254* (2018.05); *H04N 13/271* (2018.05)

(56) References Cited

U.S. PATENT DOCUMENTS

| | | | |
|---|---|---|---|
| 10,055,657 | B2 | 8/2018 | Fang et al. |
| 2006/0018507 | A1 | 1/2006 | Rodriguez et al. |
| 2007/0024614 | A1 | 2/2007 | Tam et al. |
| 2009/0033760 | A1 | 2/2009 | Oh et al. |
| 2011/0096832 | A1 | 4/2011 | Ying et al. |
| 2012/0051631 | A1 | 3/2012 | Nguyen et al. |
| 2012/0056982 | A1 | 3/2012 | Katz et al. |
| 2012/0127270 | A1 | 5/2012 | Ying et al. |
| 2012/0162363 | A1* | 6/2012 | Huang ............ H04N 21/440218 348/43 |
| 2012/0274634 | A1 | 11/2012 | Yamada et al. |
| 2013/0016900 | A1 | 1/2013 | Kim et al. |
| 2013/0022111 | A1* | 1/2013 | Chen .................... H04N 19/597 375/240.12 |
| 2013/0156332 | A1 | 6/2013 | Tian |
| 2013/0215233 | A1* | 8/2013 | Wang .................... H04N 13/239 348/47 |
| 2013/0250053 | A1* | 9/2013 | Levy .................... H04N 13/207 348/43 |
| 2013/0257851 | A1* | 10/2013 | Lee ....................... H04N 13/261 345/419 |
| 2013/0329066 | A1* | 12/2013 | Zhou .................... H04N 5/23248 348/208.99 |
| 2014/0023292 | A1 | 1/2014 | Yamada |
| 2014/0055560 | A1 | 2/2014 | Fu et al. |
| 2014/0104274 | A1 | 4/2014 | Hilliges et al. |
| 2014/0253688 | A1* | 9/2014 | Metz ...................... G01S 17/89 348/46 |
| 2014/0267631 | A1* | 9/2014 | Powers .............. H04N 5/23241 348/47 |
| 2014/0354775 | A1 | 12/2014 | Barsoum et al. |
| 2015/0016713 | A1 | 1/2015 | Mori et al. |
| 2015/0030232 | A1 | 1/2015 | Parkhomenko et al. |
| 2015/0049169 | A1* | 2/2015 | Krig ..................... H04N 13/211 348/46 |
| 2015/0130908 | A1* | 5/2015 | Kang ...................... G06T 7/50 348/46 |
| 2015/0281618 | A1 | 10/2015 | Saito |
| 2016/0077206 | A1* | 3/2016 | Dokmanic .............. G01S 15/89 367/11 |
| 2017/0137048 | A1 | 5/2017 | Nobayashi et al. |
| 2017/0195654 | A1* | 7/2017 | Powers .................. G06T 7/521 |
| 2017/0216626 | A1 | 8/2017 | Berlinger et al. |
| 2017/0272651 | A1 | 9/2017 | Mathy et al. |
| 2017/0374269 | A1* | 12/2017 | Govindarao ....... H04N 5/23293 |
| 2018/0309970 | A1* | 10/2018 | Gupta .................. H04N 13/161 |
| 2019/0113606 | A1 | 4/2019 | Mathy et al. |

FOREIGN PATENT DOCUMENTS

| | | |
|---|---|---|
| CN | 102622776 | 8/2012 |
| CN | 106144816 | 11/2016 |
| JP | 2013/509104 | 3/2013 |
| JP | 2013/545200 | 12/2013 |
| JP | 2015/19204 | 1/2015 |
| WO | 2014/120613 | 8/2014 |
| WO | 2019/075473 | 4/2019 |

OTHER PUBLICATIONS

Marin et al., Reliable Fusion of ToF and Stereo Depth Driven by Confidence Measures, European Conference on Computer Vision (ECCV), Oct. 16, 2016, 16 pages.

International Search Report and Written Opinion issued in PCT/US2018/055907 dated Feb. 8, 2019, 15 pages.

English Translation (Google) of the Bibliographic Data, Description and Claims for CN102014293A (see 15 above).

Non-Final Office mailed in the U.S. Appl. No. 16/160,723 dated Apr. 13, 2020.

* cited by examiner

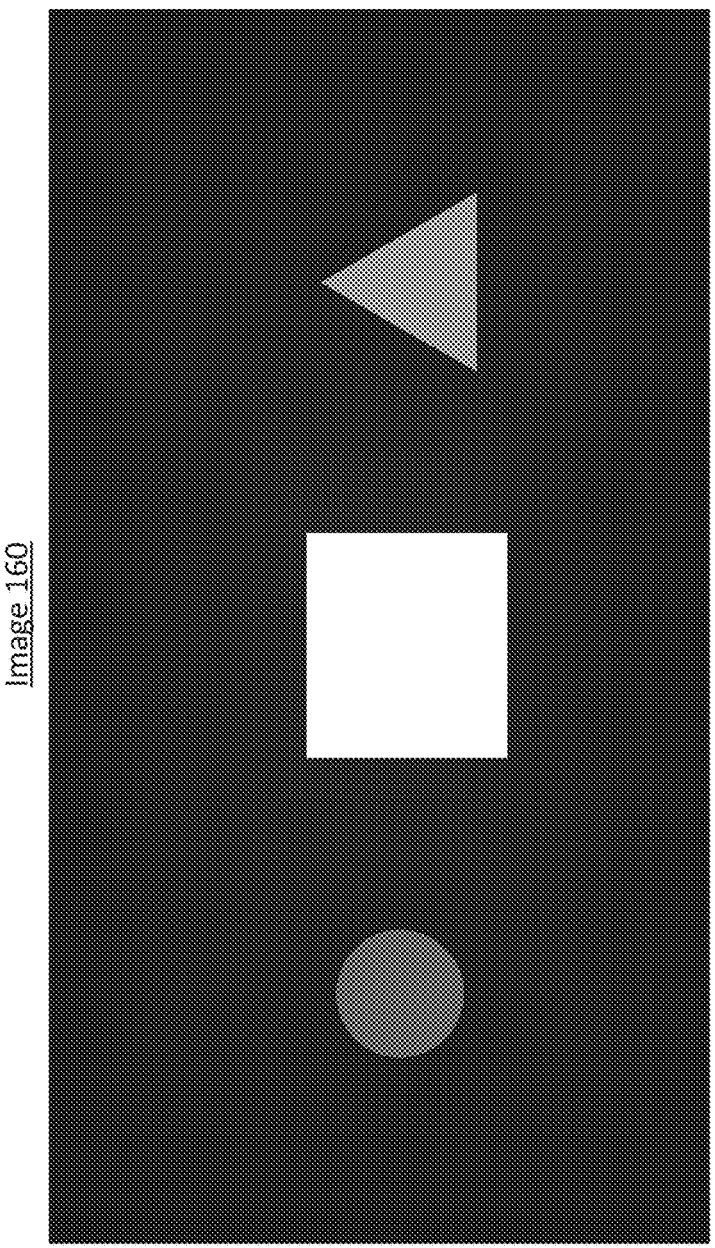
FIG. 1B

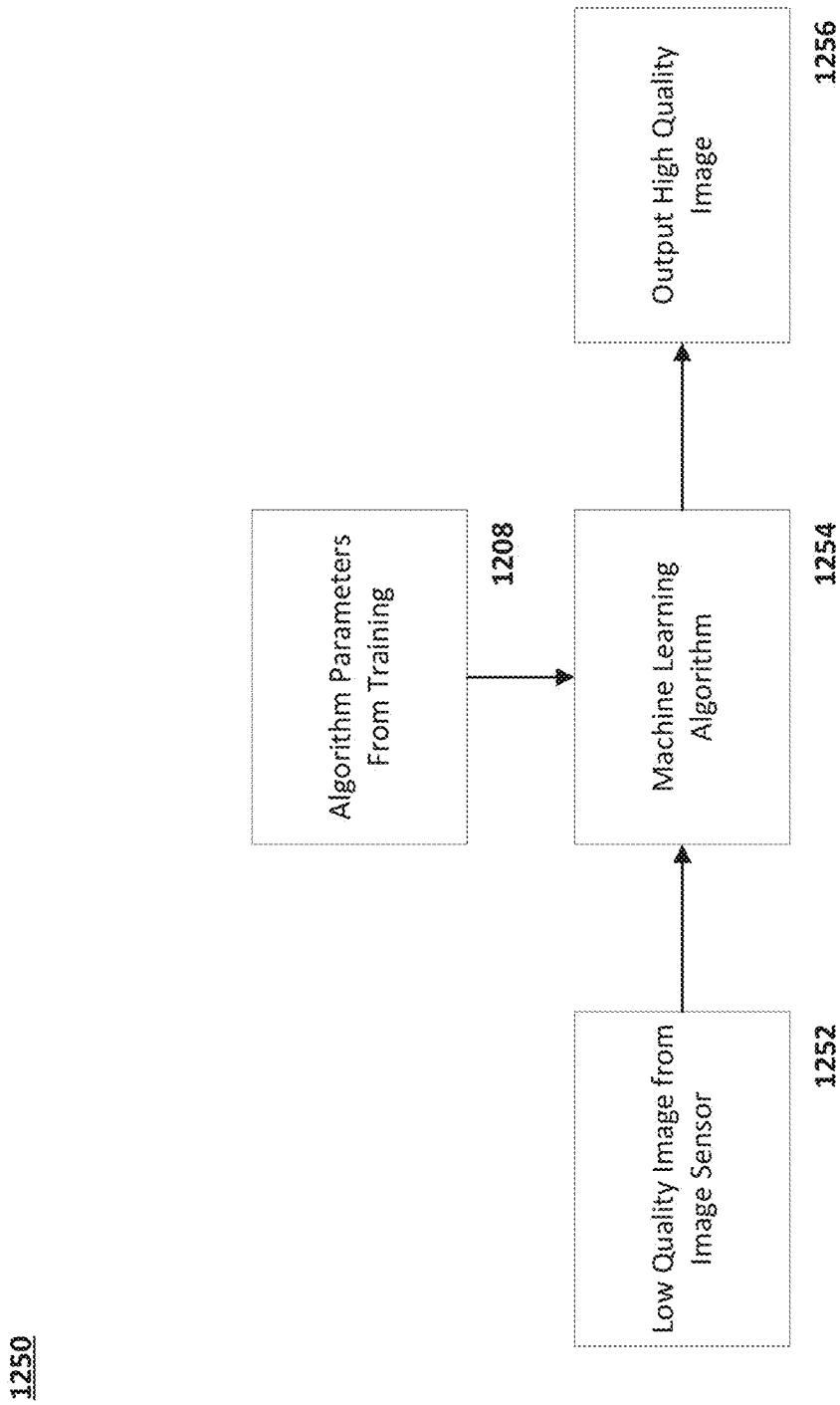

1500

```
┌─────────────────────────────────────────────────────────┐
│ Identifying a rigid body in an image for determining rigid │  1502
│           body translation information                   │
└─────────────────────────────────────────────────────────┘
                            │
                            ▼
┌─────────────────────────────────────────────────────────┐
│ Acquiring a known depth map of the image, a pixel-wise   │
│ location of the rigid body in the image, and a focal length │  1504
│                    of the camera                         │
└─────────────────────────────────────────────────────────┘
                            │
                            ▼
┌─────────────────────────────────────────────────────────┐
│ Capturing a low power image of the scene (e.g., a 2D RGB │  1506
│           image or low power IR image)                   │
└─────────────────────────────────────────────────────────┘
                            │
                            ▼
┌─────────────────────────────────────────────────────────┐
│ Determining from the captured low power image how the    │
│ rigid body has changed position from the initial pixel-wise │  1508
│                       location                           │
└─────────────────────────────────────────────────────────┘
                            │
                            ▼
┌─────────────────────────────────────────────────────────┐
│ Updating the depth map based on the changed position of  │  1510
│                    the rigid body                        │
└─────────────────────────────────────────────────────────┘
```

```
┌─────────────────────────────────────────────┐
│   Identifying the pixels for which the method of      │
│ extrapolating the depth map will not give a correct depth │   2002
│                    estimate                 │
└─────────────────────────────────────────────┘
                       │
                       ▼
┌─────────────────────────────────────────────┐
│ Finding regions in the image with a correct depth estimate │
│   that can be used to estimate the depth for the pixels for  │
│  which the method of extrapolating the depth map will not │   2004
│             give a correct depth estimate           │
└─────────────────────────────────────────────┘
                       │
                       ▼
┌─────────────────────────────────────────────┐
│ Finding regions in the image with a correct depth estimate │
│   that can be used to estimate the depth for the pixels for  │
│  which the method of extrapolating the depth map will not │   2006
│             give a correct depth estimate           │
└─────────────────────────────────────────────┘
```

FIG. 20

REDUCING POWER CONSUMPTION FOR TIME-OF-FLIGHT DEPTH IMAGING

CROSS REFERENCE TO RELATED APPLICATIONS

This application claims the benefit pursuant to 35 U.S.C. § 119(e) to U.S. Provisional Patent Applications having U.S. Ser. No. 62/309,421 filed on Mar. 16, 2016, U.S. Ser. No. 62/361,488 filed on Jul. 12, 2016, and U.S. Ser. No. 62/398,519 filed on Sep. 23, 2016, the entirety of which are incorporated by reference herein.

FIELD

This disclosure pertains to systems and methods for lowering power consumption for time-of-flight depth imaging.

BACKGROUND

Sensing of the distance between a device and an object may be performed by emitting light from the device and measuring the time it takes for light to be reflected from the object and then collected by the device. A distance sensing device may include a light sensor which collects light that was emitted by the device and then reflected from objects in the environment.

In time-of-flight (TOF) three-dimensional (3D) image sensors, the image sensor captures a two-dimensional image. The image sensor is further equipped with a light source that illuminates objects whose distances from the device are to be measured by detecting the time it takes the emitted light to return to the image sensor. This provides the third dimension of information, allowing for generation of a 3D image. The use of a light source to illuminate objects for the purpose of determining their distance from the imaging device may utilize a substantial amount of power.

SUMMARY

Aspects of the embodiments are directed to a method of operating an imaging device. The method can include capturing a first image by an image sensor; identifying at least part of an object in the captured image; capturing a second image by the image sensor; determining from the second image a change in position of the at least part of the object; and updating a depth map based on the change in position of the at least part of the object.

Aspects of the embodiments are directed to an imaging device that includes an image sensor; a light source; and an image processor. The imaging device is configured to capture a first image by an image sensor; identify at least part of an object in the captured image; capture a second image by the image sensor; determine from the second image a change in position of the at least part of the object; and update a depth map based on the change in position of the at least part of the object.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1B depicts an illustrative distance map produced by the imaging device shown in FIG. 1A, according to some embodiments;

FIG. 12B is a process flow diagram for using determined algorithm parameters to provide a higher quality image from a lower quality captured image in accordance with embodiments of the present disclosure.

FIG. 15 is a process flow diagram for updating a depth map through rigid body translation information in accordance with embodiments of the present disclosure.

FIG. 20 is a process flow diagram for extrapolating background pixels for an updated depth map.

DETAILED DESCRIPTION

Aspects of the present application provide power-efficient techniques for operating a TOF 3D sensing system, such that an illumination source of the TOF 3D sensing system is operated less frequently than each frame for which distance information is desired. A lower power alternative manner of determining distance, such as by comparing two two-dimensional (2D) images, may be used to determine distance to an object when the illumination source is not used. In at least some embodiments, then, the illumination source is used to determine distance only when other lower power techniques are inadequate, namely when a lower power alternative distance determination mechanism is unable to determine the distance to an imaged object. In this manner, the power consumed by the illumination source may be reduced.

Obtaining information about distance in a third dimension from two-dimensional images may benefit a wide variety of applications, such as those in which three-dimensional images are desired. The three dimensional images themselves may be the desired end goal in some settings, and in other settings the determined distance information in the third dimension may allow for tracking the movement of an object or may assist in making decisions about actions to take, such as navigating a physical environment. To gain information about the third dimension of an object or environment, information regarding the time it takes for light to illuminate the object/environment can be used, known as the "time of flight" or "TOF" for short. However, illuminating and calculating the time of flight information for each frame of an image or image sequence can be both processor and energy intensive. To lower the processing and power requirements, a number of techniques for image sensing systems are disclosed. In some embodiments, the image sensing systems use time of flight illumination techniques along with alternative distance sensing techniques, such that the time of flight techniques are performed based on when changes are detected in an object or environment or after a certain period of time has elapsed.

According to some embodiments described herein, distance information may be determined by using an imaging device configured to emit illumination light and to sense illumination light that is reflected back to the device from objects in the environment. In some cases, the same imaging device may additionally capture two-dimensional images of the environment (e.g., using an identical image sensor as was used to sense the reflected illumination light, or otherwise). An illustrative imaging device is depicted in the TOF 3D sensing system 100 of FIG. 1A.

Figure 1A:
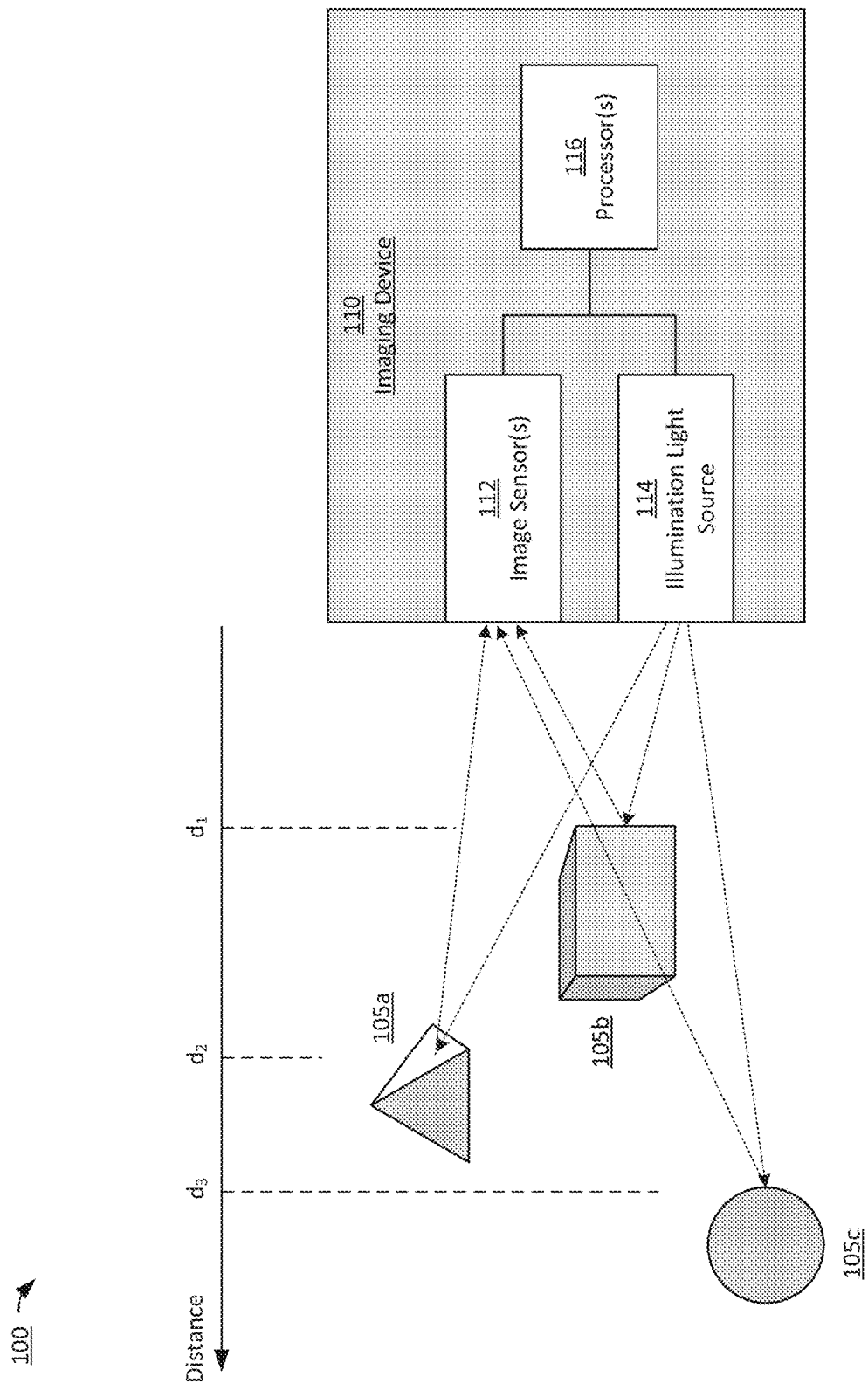
FIG. 1A depicts an illustrative imaging device configured to sense distance, according to some embodiments.

In the example of FIG. 1A, imaging device 110 includes image sensor(s) 112 and an illumination light source 114, both of which are controlled by processor(s) 116. Three illustrative objects 105a, 105b and 105c are positioned distances $d_2$, $d_1$ and $d_3$, respectively, from the imaging device. The illumination light source 114, which can be a laser light source such as a laser diode, emits illumination light (e.g., laser light) which travels outward from the imaging device, is reflected from the objects 105a-105c, and is incident upon the image sensor(s) 112. It will be appreciated that for clarity only those light rays that are both incident upon the objects 105a, 105b or 105c and reflect to the image sensor(s) are depicted in the figure, and that in general there will be other light rays both emitted from the illumination light source and light rays reflected in directions other than those shown in the figure.

Image sensor(s) 112 may be configured to recognize both visible light and infrared light (e.g., may be a combined RGB and IR sensor). In such cases, the illumination light source may be a source of infrared radiation so that the image sensor(s) 112 can distinguish between simultaneously received infrared radiation (that comprises illumination light reflected from objects in the environment) and visible light (from viewing objects in the environment in the visible spectrum). Image sensor 112 may include any suitable image sensor technology, including but not limited to, Charge Coupled Device (CCD) or Complementary Metal Oxide Semiconductor (CMOS) imaging devices.

In some implementations, image sensor(s) 112 may include a plurality of pixels that collect reflected illumination light for a portion of a scene being viewed by the imaging device. By analyzing the received light, the image sensor can determine, for each pixel, a distance to an object viewed by that pixel. Thus, a "distance map" of a scene may be imaged by the image sensor(s) that is analogous to a conventional two-dimensional (2D) image except that each pixel measures distance instead of light intensity. An illustrative distance map 150 for the scene depicted in FIG. 1A is shown in FIG. 1B. In the image 160 shown in FIG. 1B, a pixel is darker the further from the imaging device the sensed object is located. Consequently, a rectangular shape corresponding to object 105b as viewed from the imaging device is measured as relatively close to the imaging device (light gray); a triangular shape corresponding to object 105a as viewed from the imaging device is measured at a middle distance from the imaging device (mid gray); and a circular shape corresponding to object 105c as viewed from the imaging device is measured as relatively far from the imaging device (dark gray).

The illumination light source 114 may consume a significant amount of power to provide light sufficiently strong to reach the objects 105a-105c and be reflected back to the image sensor(s). This power consumption can represent a significant portion of available power of a TOF 3D sensing system, particularly when the TOF 3D sensing system is battery-operated, such as for a portable device.

Applicant has recognized and appreciated that distance sensing may be performed by an imaging device with a higher power efficiency by emitting illumination light in only some, not all, cases in which a distance determination is desired. In those cases in which illumination light is not emitted by the device, image analysis techniques may be used to estimate distances by comparing 2D images captured by the imaging device and detecting how an object or objects in those images change over time.

According to some embodiments, distances previously determined when illumination light was produced and captured may be used as a reference to aid in estimation of distance using 2D image analysis techniques. For example, illumination light may be emitted periodically to periodically determine distances, and in between those emissions image analysis may be performed to determine distances (e.g., using the previously-determined distances obtained using illumination light as a reference point).

According to some embodiments, a decision of whether to emit illumination light (to determine distances by collecting the reflected illumination light) may be based on an analysis of 2D images. The analysis may determine how accurate an estimation of distance will be based on one or more 2D images, so that when the accuracy falls below an acceptable threshold, a decision may be made to obtain a more accurate determination of distance using illumination light. In this manner, illumination light may be emitted only when a 2D image analysis does not produce acceptably accurate distance measurements, which may reduce the frequency with which the illumination light is emitted, thereby reducing power usage.

While aspects of the present disclosure may be used in any suitable imaging device, there may be particular advantages to applying such aspects within imaging devices that capture light during a plurality of frames, such as in video capture. Some imaging devices may be configured to ultimately preserve a single image yet may capture images a number of times prior to and/or after the image device has been activated to preserve the single image (e.g., devices configured to display a scene prior to capture of a single image for purposes of previewing the still image, and/or devices configured to capture a plurality of images when activated to capture a single image so that a single image can be selected and/or synthesized from the plurality of images). For the purposes of the discussion herein, a "frame" is considered to be applicable to both image capture during: (i) video capture; and (ii) still image capture where multiple images are registered in a device during the still image capture process (including, but not limited to, those examples above).

According to some embodiments, determining whether to emit illumination light based on an analysis of a 2D image may be performed in the same frame during which the 2D image was captured. Making the determination within the same frame may ensure that, in the case it is determined that illumination light is not to be emitted, a 2D image may be captured during the subsequent frame without there being an interim frame in which the determination is be made. Accordingly, the imaging device may operate efficiently by capturing an image during each frame. According to some embodiments, once it is determined that illumination light is to be emitted, the illumination light is emitted during the same frame during which the determination was made. Alternatively, if there is insufficient time during a frame to capture a 2D image, determine whether to emit illumination light and also emit the illumination light (e.g., because the imaging device does not have the processing capacity to perform all these steps within the frame because the frame time is very short and/or due to processing limitations of the device), the emission of illumination light may occur in a subsequent frame.

According to some embodiments, determination of a distance using illumination light, such as laser light from a laser diode, may use a pulse modulation technique. In pulse modulation, illumination light is emitted as a pulse of known duration so that the reflected light pulse can be identified and its time of flight measured (and therefore the distance to an object determined). In some implementations, a pulse modulation technique may operate an image sensor with a plurality of shutters that each capture a segment of the reflected illumination light pulse. The fraction of reflected illumination light that is measured during each shutter may imply the time of flight of the light pulse. An example of this approach is discussed below in relation to FIG. 4.

According to some embodiments, determination of a distance using illumination light may use a continuous wave technique. In such a technique, a distance to an object is determined by measuring a phase shift of light reflected from an object. The phase shift is indicative of a distance to the object when a wavelength of the illumination light is known.

Following below are more detailed descriptions of various concepts related to, and embodiments of, techniques of distance sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 2:
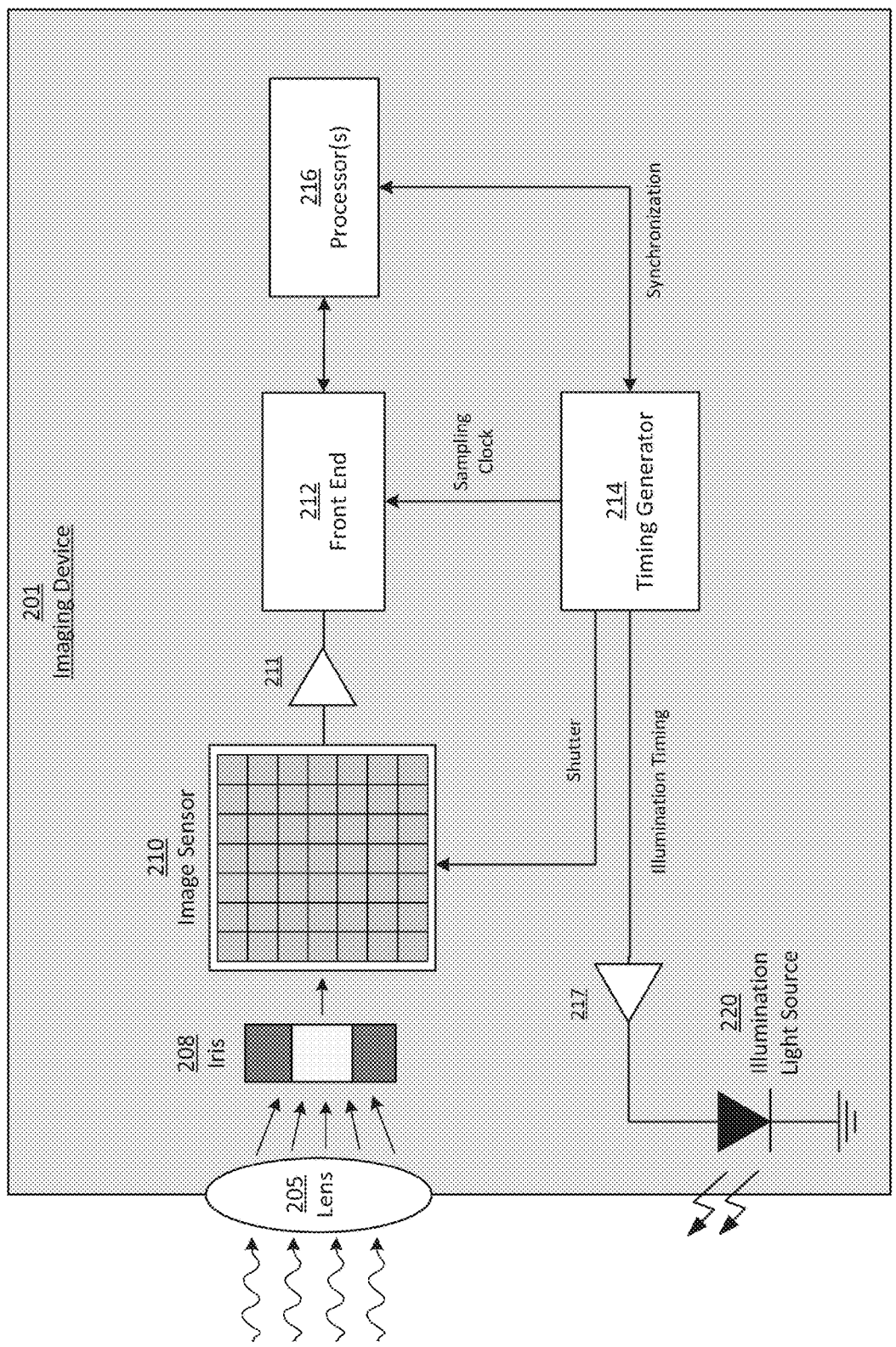
FIG. 2 is a block diagram of an imaging device, according to some embodiments.

FIG. 2 is a block diagram of a TOF 3D sensing system 200, according to some embodiments. The TOF 3D sensing system 200 includes an imaging device 201 that includes an image sensor 210 which receives light from outside of the imaging device via lens 205 and iris 208. The imaging device also includes an illumination light source 220 configured to emit illumination light from the device. The illumination light source 220 may be a laser diode and the illumination light may be laser light, although alternatives are possible. The illumination light source 220 is controlled by timing generator 214 which also controls the iris 208, allowing the image sensor 210 to be in a shuttered state (not collecting light) or an open state (collecting light). Light collected by the image sensor 210 is read out by front end 212, which may include any suitable circuitry and which operates according to a clock defined by timing generator 214. Processor(s) 216 may provide synchronization signals to the timing generator 214 and read digital image data from the front end 212.

In the example of FIG. 2, illumination light source 220 is a laser diode, though the illumination light source may generally include any device configured to produce laser light or other types of light. According to some embodiments, the illumination light source 220 may include light of non-visible wavelengths (e.g., infrared light or near infrared light, as non-limiting examples). According to some embodiments, the illumination light source may produce light of a single wavelength. According to some embodiments, illumination light source may include one or more diffusers and/or other optical components to direct light from the source to multiple objects within the environment.

In the example of FIG. 2, optional drivers 211 and 217 are included and positioned as shown to provide suitable amplification functionality of image sensor output signal(s) and of illumination signals provided to the illumination light source, respectively.

According to some embodiments, image sensor 210 may be configured to both collect light for the purpose of producing a 2D image and to collect illumination light emitted by illumination light source 220 and reflected from an object in the environment. Image sensor 210 may be configured in numerous ways so that these two sources of light may be distinguished. As an example, according to some embodiments, one or more pixels of the image sensor may include a color filter (e.g., red, green and blue filters in a Bayer pattern or otherwise). According to some embodiments, the image sensor 210 may be a combined RGB and IR sensor.

According to some embodiments, image sensor 210 may comprise two separate sets of pixels, where each set is configured to exclusively capture one of the two sources of light (light for a 2D image and reflected illumination light). As discussed above, the illumination light may include light of non-visible wavelengths allowing it to be distinguishable from visible light collected for a 2D image. The two light sources may be separated (e.g., by a prism) and directed to different image sensors.

According to some embodiments, image sensor 210 may include two different types of pixels (e.g., interspersed, such as in a checkerboard pattern) that are each configured to capture one of the two sources of light (light for a 2D image and reflected illumination light). The light incident upon the imaging device may thereby all be directed to the image sensor's pixels, a portion of which (e.g., half) collect visible light that may be used to produce a 2D image and a portion of which (e.g., half) collect reflected illumination light (e.g., infrared light) that may be used to determine distance information.

According to some embodiments, image sensor 210 may include pixels that are configured to collect both of the two sources of light (light for a 2D image and reflected illumination light). The pixels may each produce a first signal indicative of the amount of visible light collected (which may be used to produce a 2D image) and a second signal indicative of the amount of reflected illumination light collected (which may be used to determine distance information).

Processor(s) 216 may implement a suitable scheme for operating the illumination light source and/or image sensor to produce 2D images while measuring distance information, as described herein. For instance, processor(s) 216 may implement method 300 described below and/or any of the pulse modulation schemes discussed in relation to FIGS. 4 and 5 below.

Figure 3:
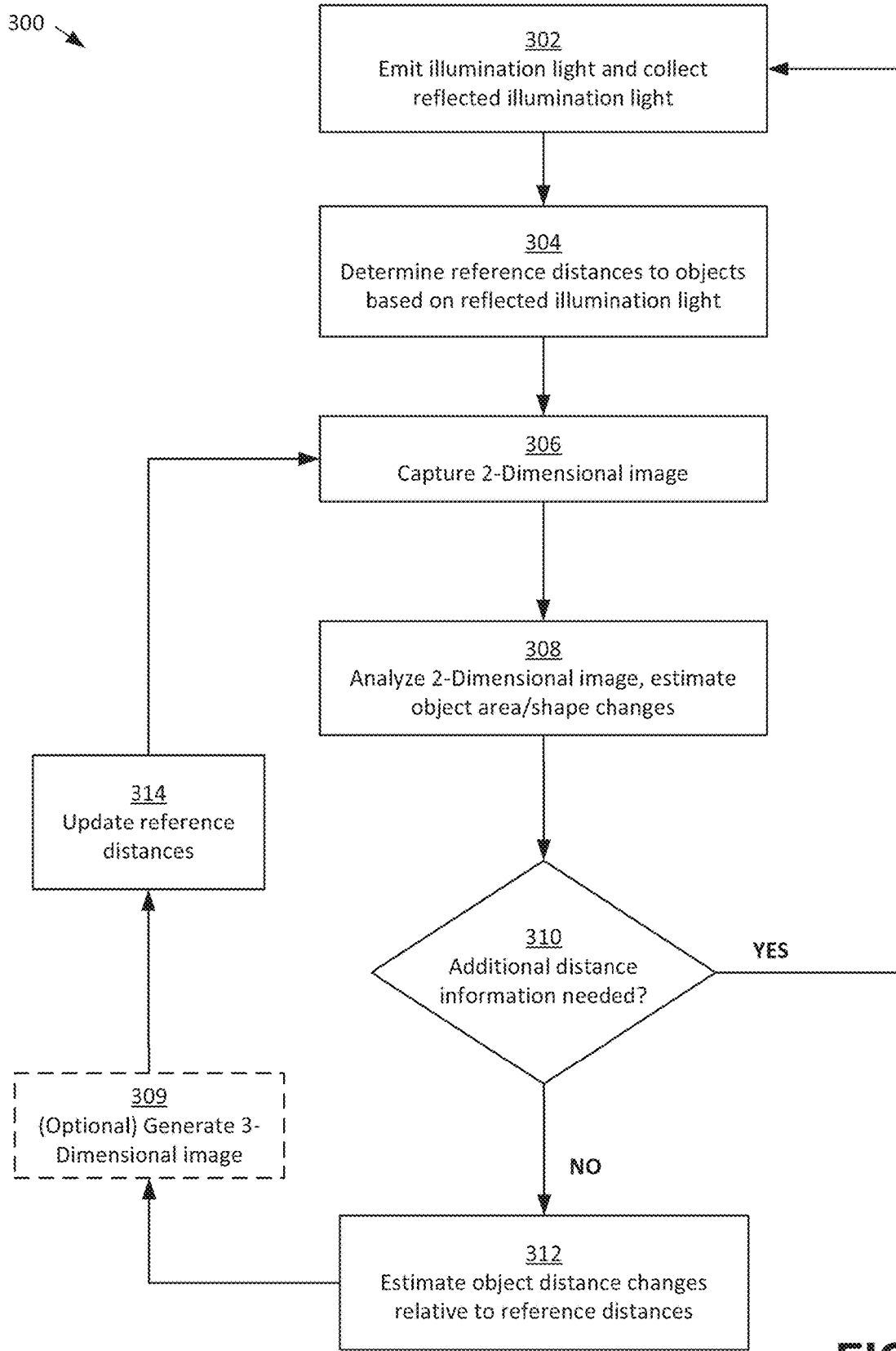
FIG. 3 is a flow chart depicting a method of determining distance information, according to some embodiments.

FIG. 3 is a flow chart depicting a method of determining distance information with a TOF 3D sensing system, according to some embodiments. The example of method 300 may be performed by, for example, imaging device 201 shown in FIG. 2 and/or imaging device 110 shown in FIG. 1. More particularly, the method 300 may be performed by a processor or processors within an imaging device by controlling an image sensor and an illumination light source.

In method 300, an imaging device determines reference distances using illumination light and then utilizes 2D images to estimate or precisely determine distance changes relative to the reference distances. As discussed above, in some embodiments, an imaging device may conclude that illumination light is to be emitted and determine distances using the illumination light upon determining that estimated distances based on one or more 2D images are insufficiently accurate (e.g., below some preset threshold accuracy). Method 300 is one illustrative example of such an approach to determining when to emit illumination light.

Method 300 begins with act 302, in which an illumination light source is operated (e.g., by a timing generator and/or other controller) to emit illumination light and an image sensor is operated (e.g., by a timing generator and/or other controller) to collect reflected illumination light. The illumination light may be emitted as a pulse of known duration or as a continuous wave, and may include any suitable wavelength(s) of light, such as infrared. For instance, act 302 may comprise steps of the pulse modulation analysis described below in relation to FIG. 4.

In act 304, the illumination light collected in act 302 is analyzed to determine distances to one or more objects. For instance, each pixel of an image sensor may receive reflected illumination light and may independently determine a distance to an object (or portion of an object) viewed by that pixel. According to some embodiments, the collected illumination light may be analyzed to determine a phase shift exhibited by the light (as per the continuous wave measurement technique discussed above). According to some embodiments, the illumination light may be collected during a plurality of shutter periods to determine a time of flight of an emitted illumination light pulse (as per the pulse modulation measurement technique described below).

In act 306, a 2D image is captured by the image sensor. As discussed above, an image sensor may utilize the same or different pixels to capture a 2D image than the pixels used to collect reflected illumination light.

In act 308, the 2D image captured in act 306 is analyzed to estimate object area and/or shape changes. Such changes may be determined relative to the object's shape as it appears in the distance map determined in act 304 and/or relative to the object's shape as it appears in a previously captured 2D image. Broadly speaking, the analysis may examine shapes of objects viewed in a distance map and/or a 2D image previously obtained and determine a change in shape and/or apparent area of the objects between an earlier state and a later state. For instance, objects that move toward the imaging device after a distance map and/or prior 2D image was captured would be expected to appear larger (have a larger area) in a subsequent 2D image. The analysis of act 308 may utilize any number of distance maps and/or 2D images captured prior to act 308 in addition to the 2D image captured in act 306 to estimate shape/area changes.

In act 310, a determination is made whether or not the area/shape changes estimated in act 308 are sufficiently well defined that additional illumination light is not necessary to determine accurate distances. In some cases, objects may move relative to the imaging device such that determining their new position and/or orientation is difficult. For example, an object may move and/or rotate to produce a specular highlight that makes determining the object's apparent size inaccurate (since the light received in this case may not be clearly indicative of the object's shape). Also, in some embodiments the 2D image captured in act 306 may be of a different scene than previously captured images, such that distance information for the 2D image captured in act 306 may not be determinable from comparison to prior 2D images.

According to some embodiments, act 308 may produce a confidence level or other indication of estimated accuracy of the determined area/shape changes, and the determination of whether to emit illumination light to determine distances may be based at least in part on whether such accuracy falls above or below a preselected threshold.

According to some embodiments, the determination in act 310 may consider multiple objects and the extent to which their area/shape changes may have been accurately (or inaccurately) determined in act 308. For instance, in some implementations it may be desirable to emit illumination light if a single object has an area/shape change estimation accuracy below a preset threshold even if other objects may have their area/shape change estimated with an accuracy above the threshold. Additionally, or alternatively, an average accuracy of all of the objects' shape/area change estimates may be considered (and compared against a preset threshold) to determine whether illumination light is to be used. Other schemes based on an ensemble of object shape/area change estimation accuracies may alternatively be implemented.

If in act 310 it is determined that additional illumination light is to be emitted to determine distances, method 300 returns to act 302. Alternatively, if it is determined that additional illumination light is not to be used, distance changes implied by (and based upon) the area/shape changes estimated in act 308 are determined in act 312.

In optional act 309, a 3-dimensional (3D) image may be generated utilizing the 2D image captured in act 306 in addition to distances determined in act 308 and/or act 304. This act may comprise generating stereoscopic images based on the 2D image captured in act 306 in addition to distance information. While in the example of FIG. 3, act 309 is depicted between acts 312 and 314, it will be appreciated that act 309 may take place any time after distances to objects have been determined.

In act 314, the reference distances previously determined in act 304 are updated based on the distance changes determined in act 312. In subsequent instances of act 314, multiple distance changes may be applied to distance changes determined in act 304. Another 2D image is then captured in act 306 and acts 308, optionally 309, 310, 312 and 314 are repeated until it is determined in an instance of act 310 that further illumination light is to be used to determine distances with a desired accuracy.

A net result of method 300 is that illumination light is only emitted in act 302 when it is determined in act 310 that the object area/shape change estimations are sufficiently inaccurate that additional illumination light will be beneficial. With a suitable algorithm to estimate these area/shape changes, it may be expected that the illumination light is emitted in only a fraction of frames of the imaging device, thereby reducing power consumption. In some embodiments, power consumption may be reduced by a factor of 2 or more. According to some embodiments, illumination light is emitted in less than half of all frames, or less than a quarter of all frames, or less than 10% of all frames.

While act 312 is depicted after act 310 in the example of FIG. 3, it will be appreciated that act 312 could also be performed prior to act 310 so that determined distances, rather than object area/shape changes, are used to determine whether additional distance information is needed in act 310.

Figure 4:
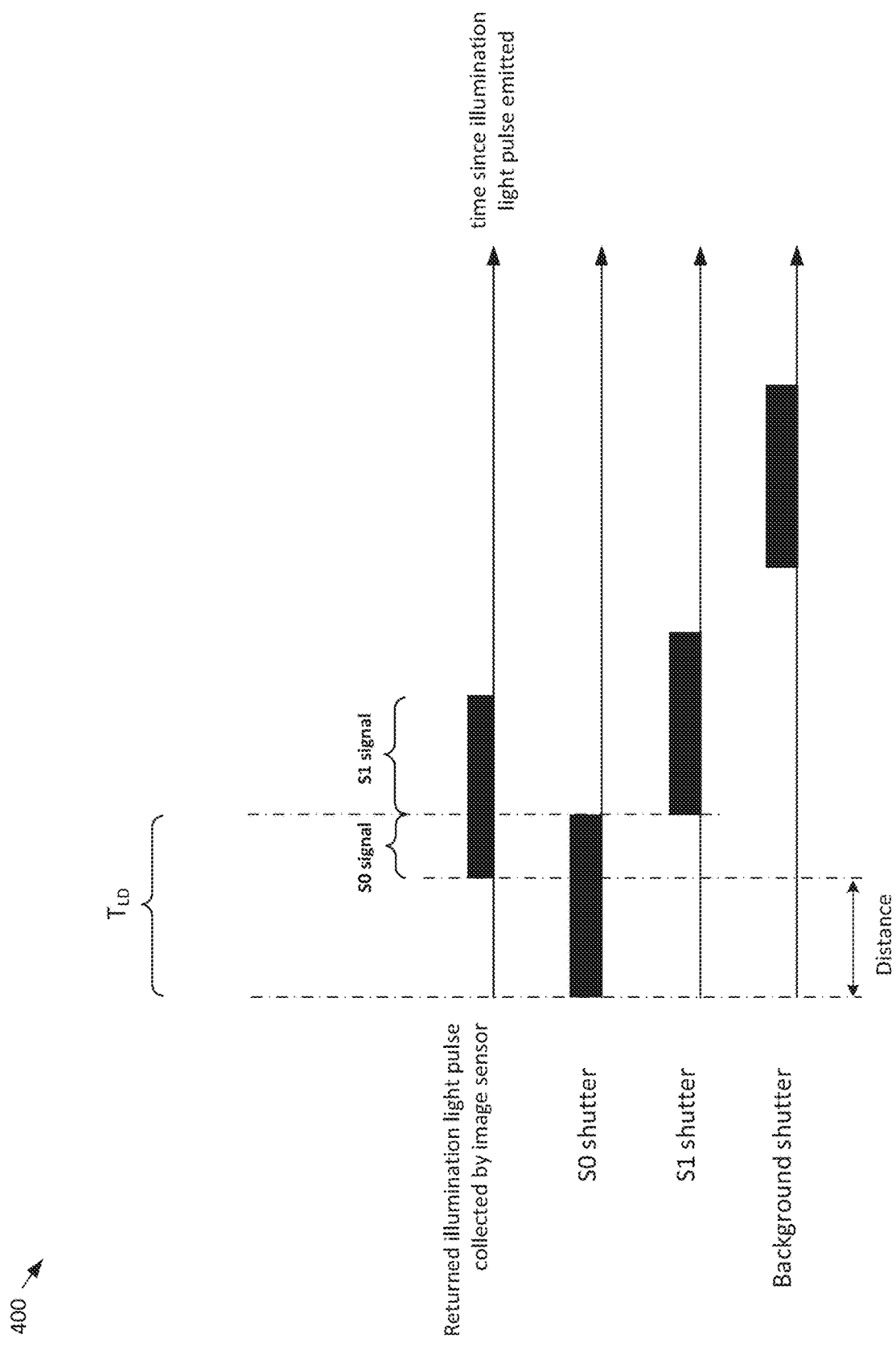
FIG. 4 illustrates a pulse modulation technique for determining a distance to an object, according to some embodiments.

FIG. 4 illustrates a pulse modulation technique for determining a distance to an object, according to some embodiments. As discussed above, in some embodiments a pulse modulation technique may be applied to determine a distance. Chart 400 illustrates one example of such a technique which may be utilized by an image sensor such as those depicted in FIGS. 1A and 2.

In the example of FIG. 4, an illumination light pulse is emitted for a period $T_{LD}$ (which may be, for example, between 10 ns and 30 ns, between 15 ns and 25 ns, 22 ns, or any value or range of values within such ranges). The figure illustrates the light pulse when it is returned to the image sensor rather than emitted for reasons that will be appreciated from the following description. The time axis shown in the figure begins when the illumination light pulse starts to be emitted. When the pulse starts to be emitted, a first shutter period (labeled "S0 shutter") begins during which the image sensor collects illumination light. When the first shutter period ends, the light collected during that period is read out of the image sensor and a second shutter period (labeled "S1 shutter") begins. When the second shutter period ends, the light collected during that period is also read out of the image sensor.

After the second shutter period ends, a background image is captured by the image sensor at the time indicated by the illustrated "Background shutter". The background shutter may capture background light with the image sensor. According to some embodiments, the background shutter signal may be subtracted from light collected during the S0 and/or S1 shutter periods to estimate the illumination pulse light received during those shutter periods in the absence of any background light (which may represent a "noise" component of the light collected during the S0 and S1 shutter periods).

According to some embodiments, the S0 and S1 shutter periods and the background image capture shutter may all occur within a single frame of the image sensor. According to some embodiments, the S0 and S1 shutter periods, the background image capture shutter and an additional capture of a 2D image by the image sensor may all occur within a single frame of the image sensor.

In the example of FIG. 4, the ratio of illumination light collected in S0, labeled as "S0 signal," versus the illumination light collected in S1, labeled as "S1 signal," is indicative of the distance of an object that reflected the illumination light to the image sensor. Since the illumination light was emitted in a pulse of known duration, the more light collected during the S0 shutter period compared with the S1 shutter period, the closer the object is to the image sensor. An illustrative returned illumination light pulse is shown in the figure with the majority of the light of that pulse being collected during the second shutter period, as indicated by the S1 signal being of greater duration than the S0 signal. Based on this approach, the distance to an object may be determined via the following formula:

$$D = \frac{1}{2} \times T_{LD} \times c \times \frac{S_1 - BG}{S_0 + S_1 - 2BG} \quad \text{(Eqn. 1)}$$

In the formula above, "$S_0$" and "$S_1$" refer to a magnitude of a signal received during the S0 and S1 shutter periods, respectively, and "BG" refers to a magnitude of a signal received during the background shutter period. For example, the magnitudes of these signals may be a light intensity signal produced by the image sensor (e.g., an illumination light intensity signal in the case of $S_0$ and/or $S_1$). Also in the formula, "c" is the speed of light and D is the determined distance to the object.

According to some embodiments, to determine a distance map, an image sensor may perform the above calculation independently for each pixel based on how much light the pixel collects during each of the S0 and S1 shutter periods. The illumination light pulse may be emitted from a single illumination light source and spread to objects in the environment using a diffuser, as discussed above.

Figure 5:
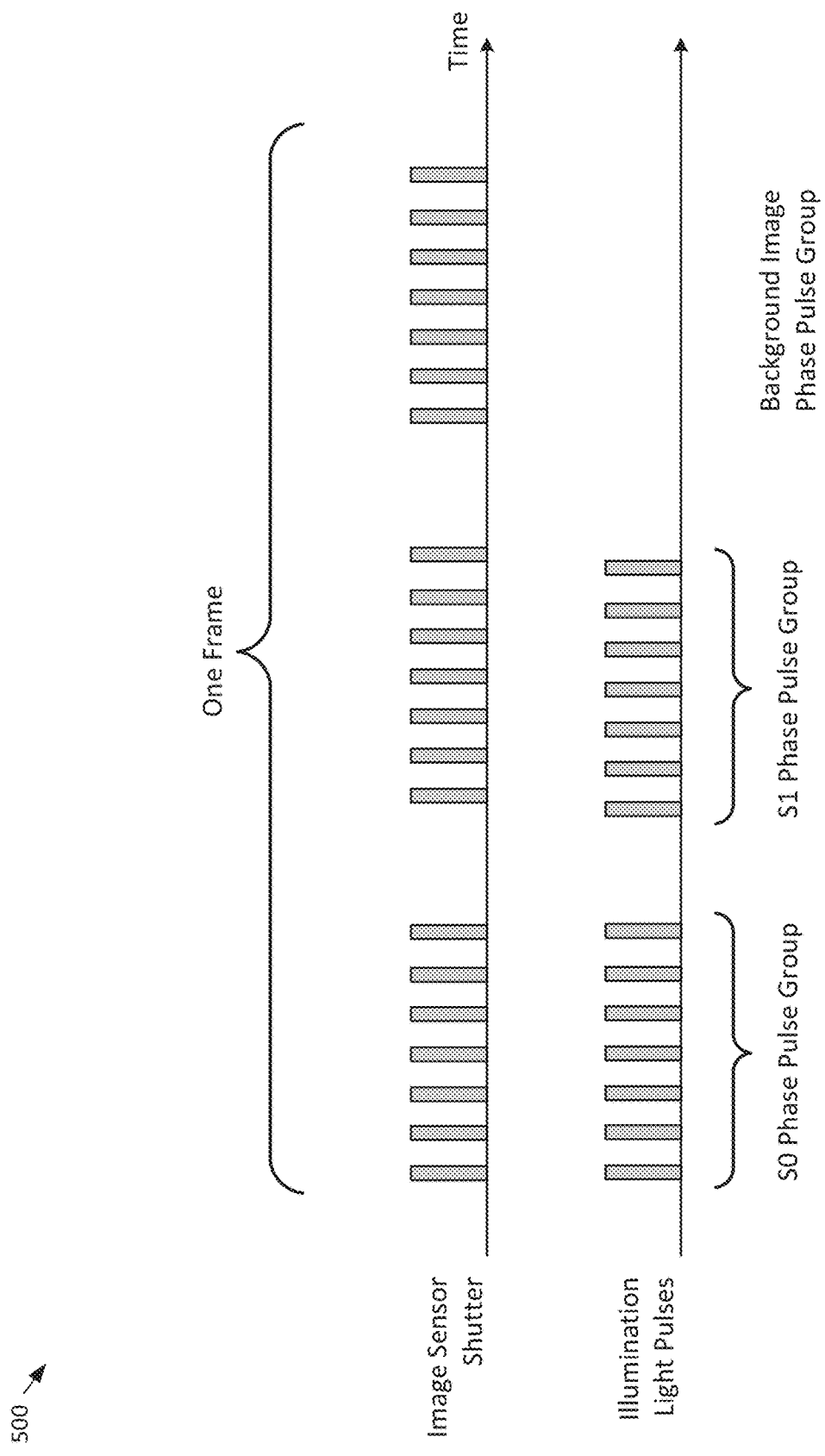
FIG. 5 depicts an illustrative pulse modulation pattern within a single imaging frame, according to some embodiments.

FIG. 5 depicts an illustrative pattern of pulse modulation of an illumination light source within a single imaging frame, according to some embodiments. In some cases it may be advantageous to emit multiple pulses of illumination light and to make multiple measurements of reflected illumination light during a single frame of an image sensor. Such an approach may, for instance, produce more accurate measurements of distance than a single measurement as shown in FIG. 4 and described above. For example, background noise of additional light captured by the image sensor may be filtered away by making repeated measurements of the illumination light. Chart 500 shown in FIG. 5 depicts one illustrative pattern of performing multiple pulse modulation measurements within a single frame using the approach described in relation to FIG. 4.

In the example of FIG. 5, a number of illumination light pulses are emitted one after another (bottom axis). When each of these pulses is emitted, an S0 shutter period (as shown in FIG. 4) in which the image sensor collects light is executed for a time period starting when emission of the pulse begins and ending when emission of the pulse ends. In the example of FIG. 5, a number of illumination light pulses combined with S0 shutter period measurements are performed in a row without any S1 shutter periods being performed.

Subsequent to the S0 phase pulse group, another group of illumination light pulses is emitted one after another. When each of these pulses is emitted, an S1 shutter (as shown in FIG. 4) is executed in which the image sensor collects light for a time period beginning when emission of the pulse ends and ending a time period equal to the duration of the pulse afterwards.

Subsequent to the S1 phase pulse group, measurements of amounts of light collected during each of the S0 and S1 shutter periods may be collated and used to determine a distance (e.g., by using Equation 1 above). Since the length of an illumination light pulse may be expected to be short (e.g., less than 30 ns) objects typically will not move very much (if at all) even during a number of periods as shown in FIG. 5. For instance, even with fourteen illumination light pulses depicted in FIG. 5 during the S0 and S1 phase pulse groups, both phase pulse groups may be completed in substantially less than a microsecond.

After the S0 and S1 phase pulse groups are completed, a background image may be captured during multiple shutter periods (no corresponding illumination light is emitted during this time). As discussed above, the background image may be captured to obtain an estimate of background "noise" present in the S0 phase group signals and the S1 phase group signals, and may be used to subtract out that noise from the S0/S1 signals. According to some embodiments, a 2D image may be further captured by the image sensor during the same frame depicted in FIG. 5.

Figure 6:
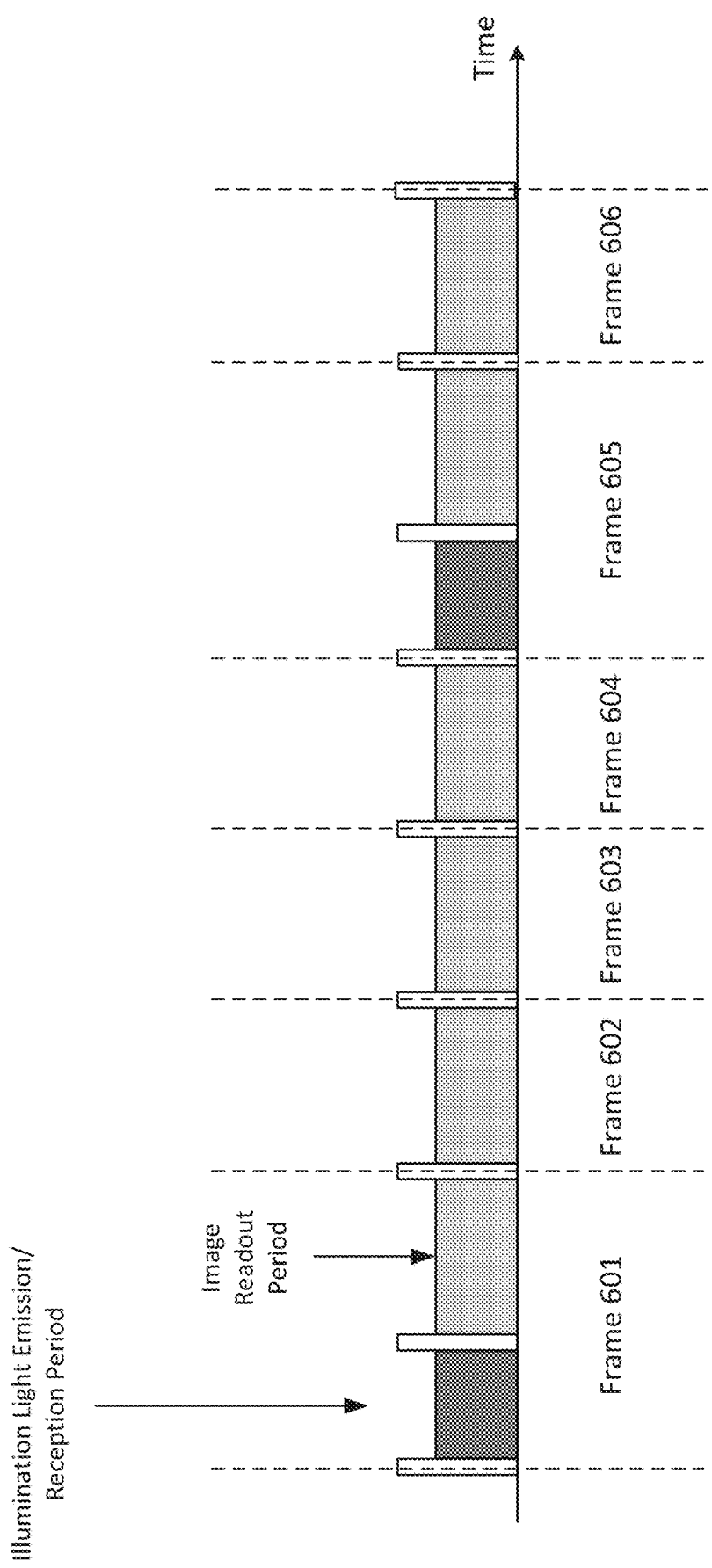
FIG. 6 illustrates a sequence of frames in which illumination light is emitted in some, but not all, frames.

FIG. 6 illustrates a sequence of frames in which illumination light is emitted in some, but not all, frames. As discussed above, in a sequence of frames a determination may be made in each of a sequence of frames whether illumination light should be emitted. In less than all of these frames, the resulting determination may be that illumination light should not be emitted. As an illustrative example of such a use case, FIG. 6 illustrates a sequence of frames 601-606 in which illumination light is emitted in frames 601 and 605, but not in frames 602, 603, 604 or 606.

Figure 7:
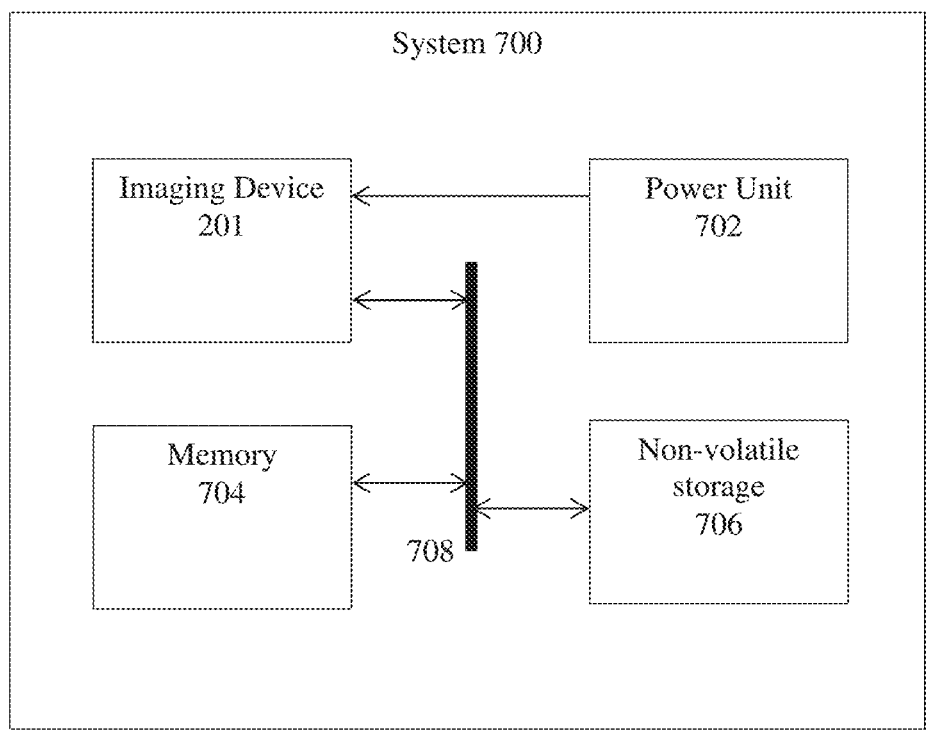
FIG. 7 illustrates an example of system incorporating an imaging device of the type described herein.

An illustrative implementation of a system 700 which may incorporate an imaging device of the types described herein is shown in FIG. 7. The system 700 includes the imaging device 201 of FIG. 2, although imaging devices according to alternative embodiments described herein may alternatively be included. A power unit 702 may be provided to power the imaging device 201, along with potentially power other components of the system. The power unit 702 may be a battery in some embodiments, such as a battery typically used in mobile phones, tablets, and other consumer electronics products. As has been described, in some embodiments the imaging device 201 may provide low power operation, and thus may facilitate the use of a low power battery as the power unit 702. However, the power unit 702 is not limited to being a battery, nor is it limited to a particular type of battery in all embodiments.

The system 700 further comprises a memory 704 and a non-volatile storage 706. Those components may be communicatively coupled to the imaging device 201 in any suitable manner, such as via a shared communication link 708. The shared communication link 708 may be a bus or other suitable connection. The memory 704 and/or non-volatile storage 706 may store processor-executable instructions for controlling operation of the imaging device 201, for example to operate in the manner described in connection with FIG. 3, and/or data captured by the imaging device 201. In connection with techniques for distance sensing as described herein, code used to, for example, signal an illumination light source to produce one or more light pulses, to open and/or close a shutter of an image sensor, read out pixels of an image sensor, perform distance calculations based on collected illumination light, etc. may be stored on one or more of memory 704 or non-volatile storage 706. Processor 216 may execute any such code to provide any techniques for distance sensing as described herein. Memory 704 may store data representative of 2D and/or 3D images captured by imaging device 201. The memory 704 and/or non-volatile storage 706 may be non-transitory memory in at least some embodiments.

Figure 8:
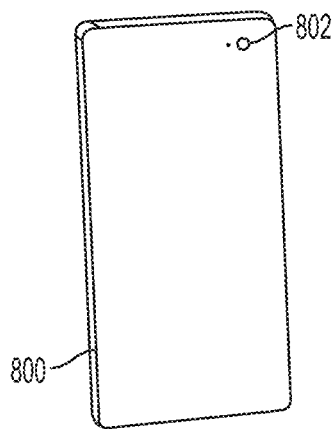
FIG. 8 illustrates a mobile device incorporating an imaging device of the types described herein.

The imaging systems described herein may be used in various applications, some examples of which are described in connection with FIGS. 8-10. A first example is that of a mobile device, such as a smartphone, tablet computer, smartwatch, or other mobile device. The imaging systems of the type described herein, such as the imaging device 201 or system 700, may be used as a camera component of the mobile device. FIG. 8 illustrates an example, in this case being a mobile phone. The mobile phone 800 includes a camera 802 which may be an imaging device of the types described herein for capturing and generating 3D images, such as imaging device 201. The use of imaging device 201 as camera 802 may be facilitated by low power consumption operation, such as the manners of operation described herein in connection with the imaging devices according to aspects of the present application. Mobile devices, such as mobile phone 800, typically operate from battery power, and thus components which consume substantial power can be impractical for use within such devices. Imaging devices of the types described herein, by contrast, may be deployed within such devices in a power efficient manner.

Figure 9:
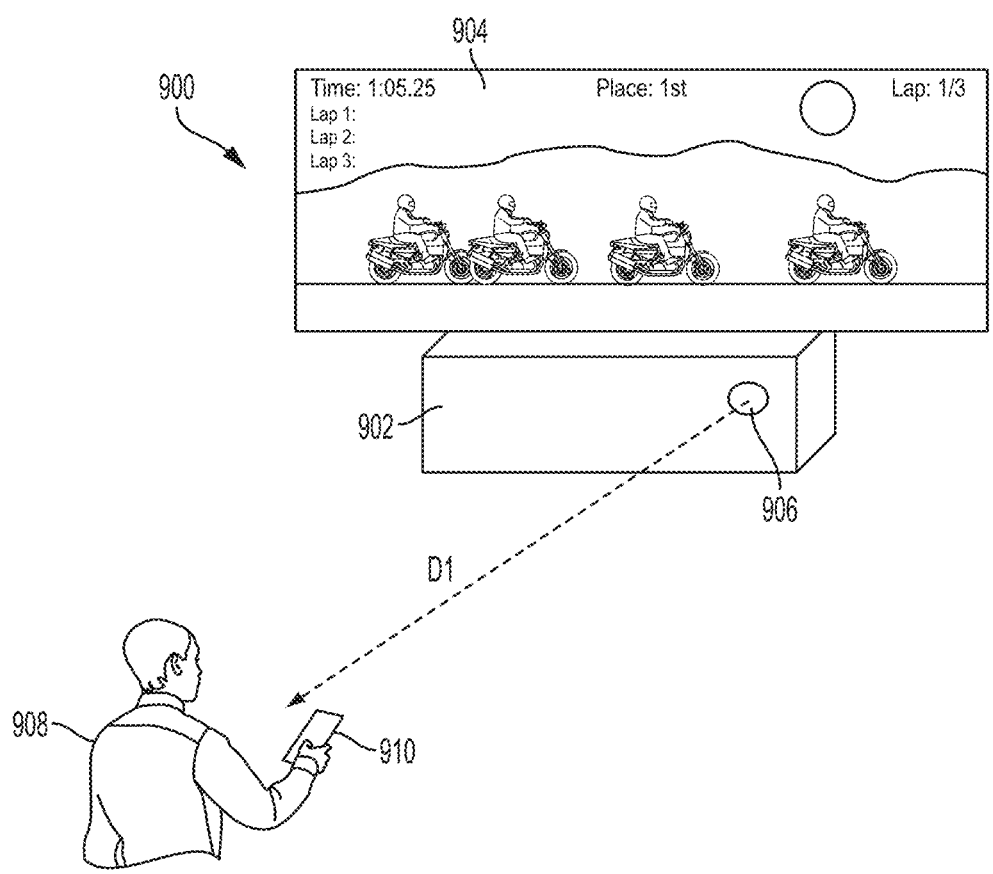
FIG. 9 illustrates a gaming console incorporating an imaging device of the types described herein.

FIG. 9 illustrates an entertainment system implementing an imaging system of the types described herein. The entertainment system 900 includes a console 902 and display 904. The console may be a video gaming console configured to generate images of a video game on the display 904, and may include a camera 906. The camera 906 may be an imaging system of the types described herein configured to capture 3D images, such as imaging device 201. In the example of FIG. 9, a user 908 may interact with the entertainment system via a controller 910, for example to play a video game. The camera 906 may capture images of the user and/or controller, and may determine a distance Dl to the user. The distance information may be used to generate a 3D image for display on the display 904 or for control of some other aspect of the entertainment system. For example, the user 902 may control the entertainment system with hand gestures, and the gestures may be determined at least in part through capturing distance information Dl.

Imaging systems of the types described herein may also be employed in robotics. FIG. 10 illustrates an example of a robot 1002 with an imaging system 1004. The robot may be mobile and the information collected by imaging system 1004 may be used to assist in navigation and/or motor control of the robot. The imaging system 1004 may be of the types described herein, for example being the system 700 or imaging device 201. Mobile robots are typically powered by batteries, and thus imaging systems of the types described herein which may operate at relatively low power according to at least some of the described embodiments may facilitate their integration with the robot.

Figure 10:
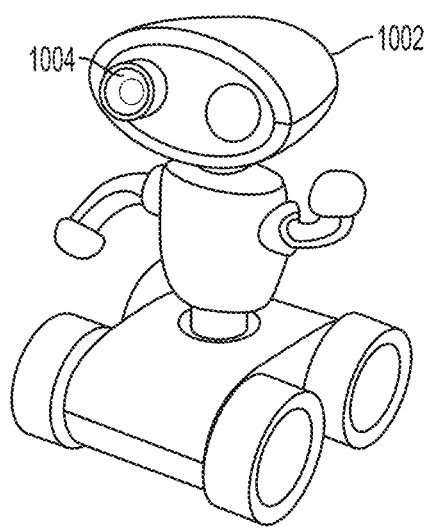
FIG. 10 illustrates a robot incorporating an imaging device of the types described herein.

Examples of uses of the technology described herein beyond those shown in FIGS. 8-10 are also possible. For example, automobiles and security cameras may implement 3D imaging devices of the types described herein.

The phrase "and/or," as used herein in the specification and in the claims, should be understood to mean "either or both" of the elements so conjoined, i.e., elements that are conjunctively present in some cases and disjunctively present in other cases. The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Using Time-of-Flight Depth Sensing with Optimized Time-Varying Light Intensity

A large source of energy consumption for depth sensing using time-of-flight cameras comes from powering the laser(s) that illuminates the scene. To get high signal-to-noise ratio (SNR), the camera sensor is exposed to sufficient amount of light, which currently typically restricts time of flight sensing to plugged-in devices. Many applications require a battery powered solution, such as drone sensing, augmented reality, automotive sensing.

To reduce power consumption with minimal loss in depth image accuracy, this disclosure describes machine learning and computer vision algorithms to enhance low quality depth images obtained from a time-of-flight camera using a low power light source (i.e. by sending fewer light pulses for a given frame). The idea of using low quality depth images obtained from a low power setting to obtain higher quality depth images as if they were collected in a high power setting by using machine learning techniques is a subset of the more general idea of using machine learning techniques to map data obtained with limited resources (e.g., power, exposure time, pixel count) to data obtained with more abundant resources. One other example is to map low SNR images to what might have been recorded as a high SNR image. Since restriction of such resources probably exhibits itself in a systematic way in the data obtained with limited resources, a data-driven/machine learning approach has the potential to successfully model and compensate such differences if there is enough training data.

To obtain a high quality depth map, embodiments include using time-insensitive frames (e.g., RGB frames) alongside low quality depth images. As an example, the power consumption of RGB camera is less than the power consumption for laser-based capture of depth images, and the RGB frames can be used to increase the resolution of the depth sensing. Such a system is trained in a data-driven approach such as by a neural net trained to predict the high quality depth map of the current frame given the current RGB image and a low quality depth map. To further save power, the system is also trained to output a confidence score that reflects how accurately it can predict the depth in the current frame using the current RGB image and previous depth estimates. When the confidence score is low, such a system can turn on a laser (or other illumination source) and/or use fewer pulses to obtain a low quality depth map. This low quality depth map can be used with the RGB image to obtain a higher quality depth map.

Figure 11:
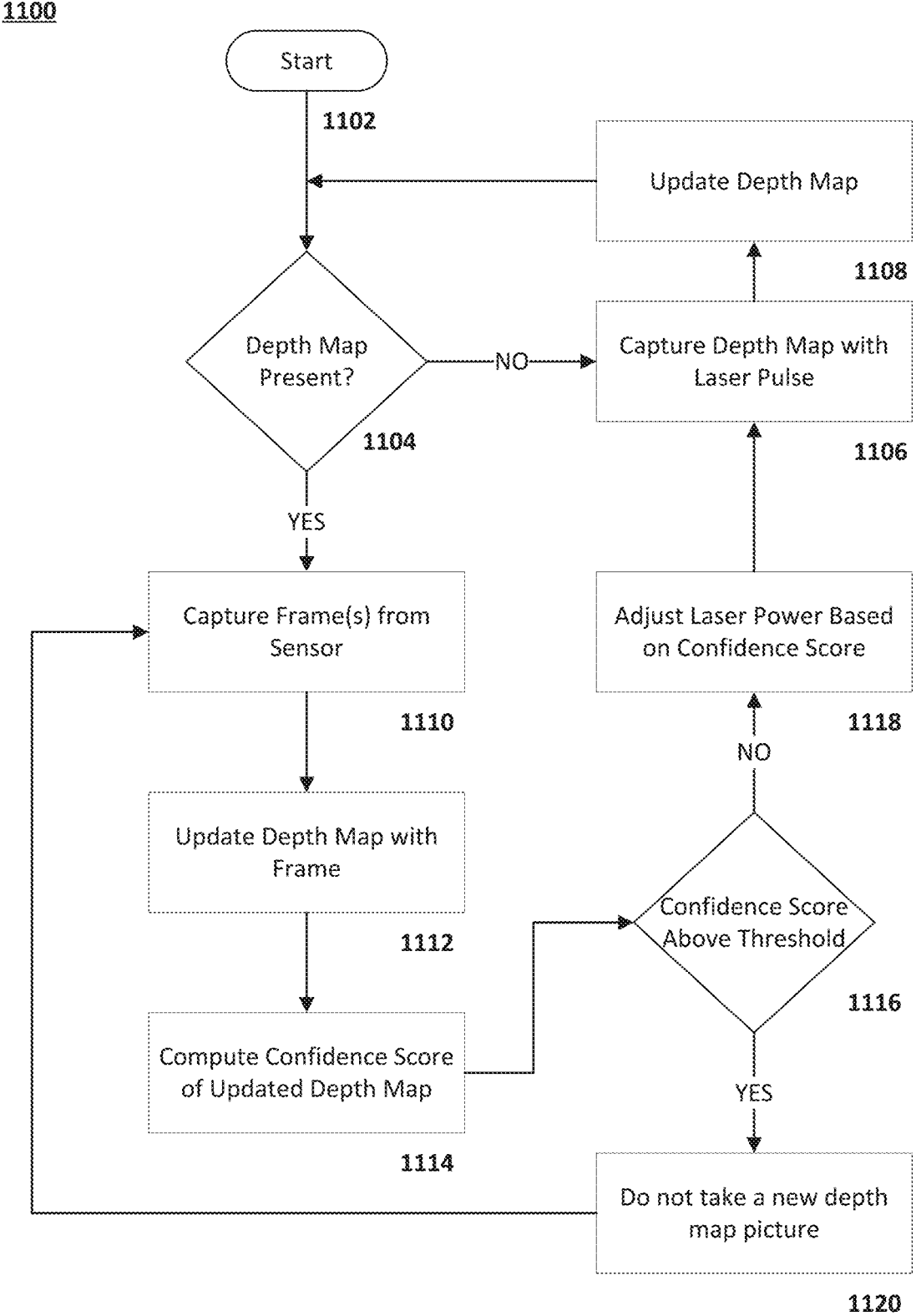
FIG. 11 is a process flow diagram for imaging using an imaging device in accordance with embodiments of the present disclosure.

FIG. 11 is a process flow diagram 1100 for imaging using an imaging device in accordance with embodiments of the present disclosure. The algorithm can the start at 1102. The imaging system processor can determine whether an existing depth map is stored (1104). If a depth map is not stored, then the imaging system can capture a depth map using laser pulse (1106). The system can store the depth map (1108).

If a depth map exists, then the imaging system can capture one or more frames (e.g., time-insensitive frames, such as RGB frames) (1110). The system can take time-insensitive images for a fixed amount of time. In embodiments, the system can perform an analysis on the time-insensitive images and take time-insensitive images until the analysis on the time-insensitive images shows that the confidence of the depth estimate accuracy is below a threshold. In embodiments, the time-insensitive images can be analyzed for motion. Image processing or computer vision algorithms such as a 3D optical flow algorithm can be used to estimate depth from the time-insensitive and depth map images.

After a set amount of time, or when the confidence level of the depth estimates obtained using the time-insensitive frames or an amount of motion is above a threshold, a new depth map can be measured using time-of-flight imaging instead of the time-insensitive image(s) (1112).

A confidence score can be computed based on the updated depth map (1114). The imaging system can determine whether the confidence score is above a threshold value (e.g., $c>T$) (1116). If the confidence score is above a threshold value, a new depth map picture is not taken (1120), and the imaging system can continue taking time-insensitive frames (1510).

If the confidence is less than (or less than or equal to) a threshold (e.g., $c<T$), then the imaging system can adjust the laser power for capturing a new depth image based on the confidence score (1118). Generally, the laser power can be determined based on a laser power function, $f(c)$, which takes in the confidence score and outputs the desired laser power for capturing a new depth map. For example, a low confidence score would result in a higher laser power function.

The imaging system can capture a new depth image using the adjusted laser power (1506), and store a new depth map (1108).

Figure 12A:
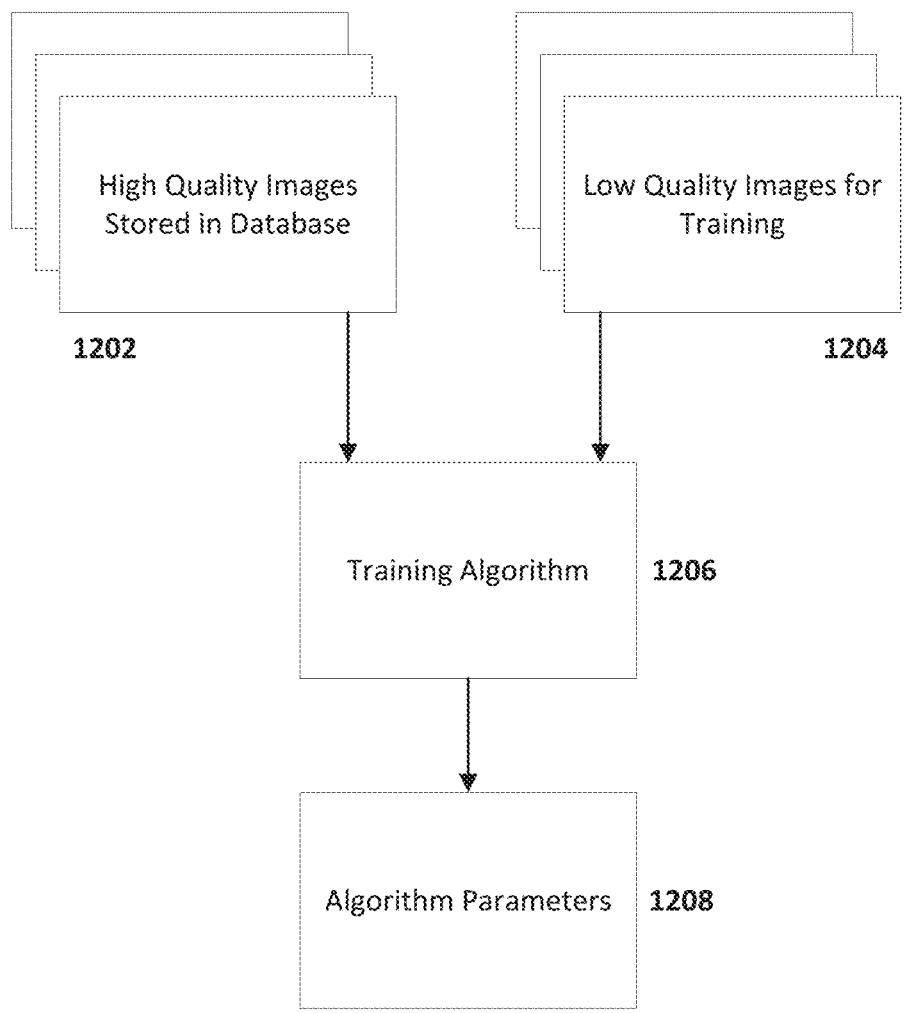
FIG. 12A is a process flow diagram for determining one or more algorithm parameters for providing higher quality images from a scene from lower quality images of the same scene in accordance with embodiments of the present disclosure.

FIG. 12A is a process flow diagram 1200 for determining one or more algorithm parameters for providing higher quality images from a scene from lower quality images of the same scene in accordance with embodiments of the present disclosure. At the outset, a plurality of high quality images can be captured and stored in a database (1202). Likewise, a plurality of similar low quality images can be captured, for training purposes (1204). The high quality images and the corresponding low quality images can be provided to a training algorithm (1206). The training algorithm can adjust one or more algorithm parameters that can be used to obtain high quality images from low quality images (1208). High quality images includes images with high resolution, high SNR, high power or high resource consumption images, or a combination of the aforementioned. Low quality images may be low resolution, low SNR, low power or resource consumption images, or a combination of the aforementioned. Through machine learning, training, data driven analyses, etc., aspects from the high quality images can be compared to the low quality images. The low quality images can be adjusted based on one or more algorithm parameters to increase their quality. These algorithm parameters can be stored for on-the-fly quality adjustment by an imaging system processor.

In embodiments, the training images can include time-sensitive images (e.g., time-of-flight depth images), and can also include one or more time-insensitive images (e.g., RGB or IR images that do not include a time measurement). Notably, during on-the-fly quality adjustments, the type of images captured would match those used in training (i.e., if a combination of time-sensitive and time-insensitive images are used for training purposes, then the same combination of time-sensitive and time-insensitive images should be used during normal camera operation).

FIG. 12B is a process flow diagram 1250 for using determined algorithm parameters to provide higher quality images from a lower quality captured image in accordance with embodiments of the present disclosure. During normal image capture, power consumption can be lowered by capturing a low quality image (1252). For example, the low quality image can be captured using low illumination power, low exposure time, low resolution, etc. The low quality image can be processed using a machine learning algorithm using the algorithm parameters determined from FIG. 12A (1254). The imaging system can output a high quality image formed by processing the low quality image using the algorithm parameters (1256).

Variable SNR Depth-Image Acquisition Using Machine Learning Feature Extraction Algorithms A time-of-flight camera takes a picture of a scene where each pixel represents the distance of the corresponding point in the scene to the camera. The distance is estimated by illuminating the scene using pulses of light (e.g., IR light) and by measuring the time it takes for a pulse to travel from the camera to a surface and from the surface back to the sensor. Instead of emitting pulses, some time-of-flight cameras emit amplitude modulated continuous waves of light and measure the phase shift between the emitted continuous-wave (CW) and the reflected wave. Time-of-flight cameras can be used in numerous applications that include virtual reality (VR), augmented reality (AR), autonomous car navigation, robot navigation, drone navigation, etc.

The aforementioned applications generally use a depth image as an input to a machine learning algorithm that performs some type of feature extraction, such as gesture recognition (e.g. to recognize a finger pinching movement). For example, a gesture recognition algorithm can have different phases such as segmentation where body parts are identified in a 3D image, and tracking where the trajectories in space of the detected body parts are tracked, and when the gesture is extracted. Other applications that can use feature extraction include object detection and collision avoidance (e.g. to detect people/objects in the vicinity of a car/robot/drone). The term "feature" can include any information that can be extracted from a frame that is obtained from a subset of pixels, and that in some cases, can change over some amount of time and across a plurality of frames.

In some embodiments, feature recognition can be performed through algorithmic training on a dataset of labelled sequences of frames (or videos) of depth images (or a combination of depth images and time-insensitive images) representing different features. In the case of gesture recognition for example, the training phase can include providing the algorithm with a plurality of sequence of frames representing various gestures and adjusting its parameters until the algorithm is able to classify them in the correct category (e.g. finger pinching movement).

As in a regular camera, the amount of light captured by the sensor determines the signal-to-noise ratio (SNR): the more light that is captured, the better is the SNR. The amount of collected light can be increased by (1) increasing the power of the light source or by (2) increasing the exposure time. Increasing the power of the light source is usually not feasible in consumer applications for eye-safety reasons. The alternative solution is to expose the sensor for a longer time with a less powerful light source. Capturing images with longer exposition time also reduces the frame-rate, which can become a problem when real-time depth videos are needed. Furthermore, long exposure times cause more blurring in the image because objects are more likely to be caught moving during longer time windows.

For both solutions, increasing the SNR means consuming more energy in the light source, which can drain the battery in portable applications, for example. The laser power is often the dominating source of energy consumption in a time-of-flight camera, and it is therefore a challenge to find ways to reduce its usage.

Embodiments of the present disclosure including machine learning algorithms performing feature extraction on depth images/videos usually assume that the scene of interest is described using a sequence (video) of frames at a given frame rate (typically 30 FPS). Each frame can either contain only a depth image, only an image obtained from a time-insensitive sensor or a combination of both. This disclosure focuses on the case when each frame contains at least a depth image acquired by a time-of-flight camera.

This disclosure describes an algorithm that learns which depth frames in the sequence have more importance for a given feature such that only a subset of frames is acquired. Because most scenes of interest are very structured (for example slowly moving hand), most of the information is actually contained in a limited number of frames and by appropriately choosing those frames, one can reduce the number of depth images and therefore reduce light source power. For example, in the case of gesture recognition, one can capture a few consecutive frames during the segmentation phase and then capture less frames during the tracking phase. In the case of object detection or collision avoidance, one could reduce the frame rate (or each depth image's SNR) when no object appears to be in the vicinity of the camera and increase the frame rate (or SNR) when the object gets closer to the camera.

In the disclosure, the algorithm being trained to perform the feature extraction is also trained to assign a SNR value to each depth image (no frame is equivalent to a frame with zero SNR, a frame with high light source power has a higher SNR). In the case of gesture recognition, the algorithm might learn that a high SNR (i.e. precise depth image/high power depth image) is required in the first frames when the gesture is not recognized, and that a lower SNR can be used once the algorithm is confident about the gesture.

Figure 13A:
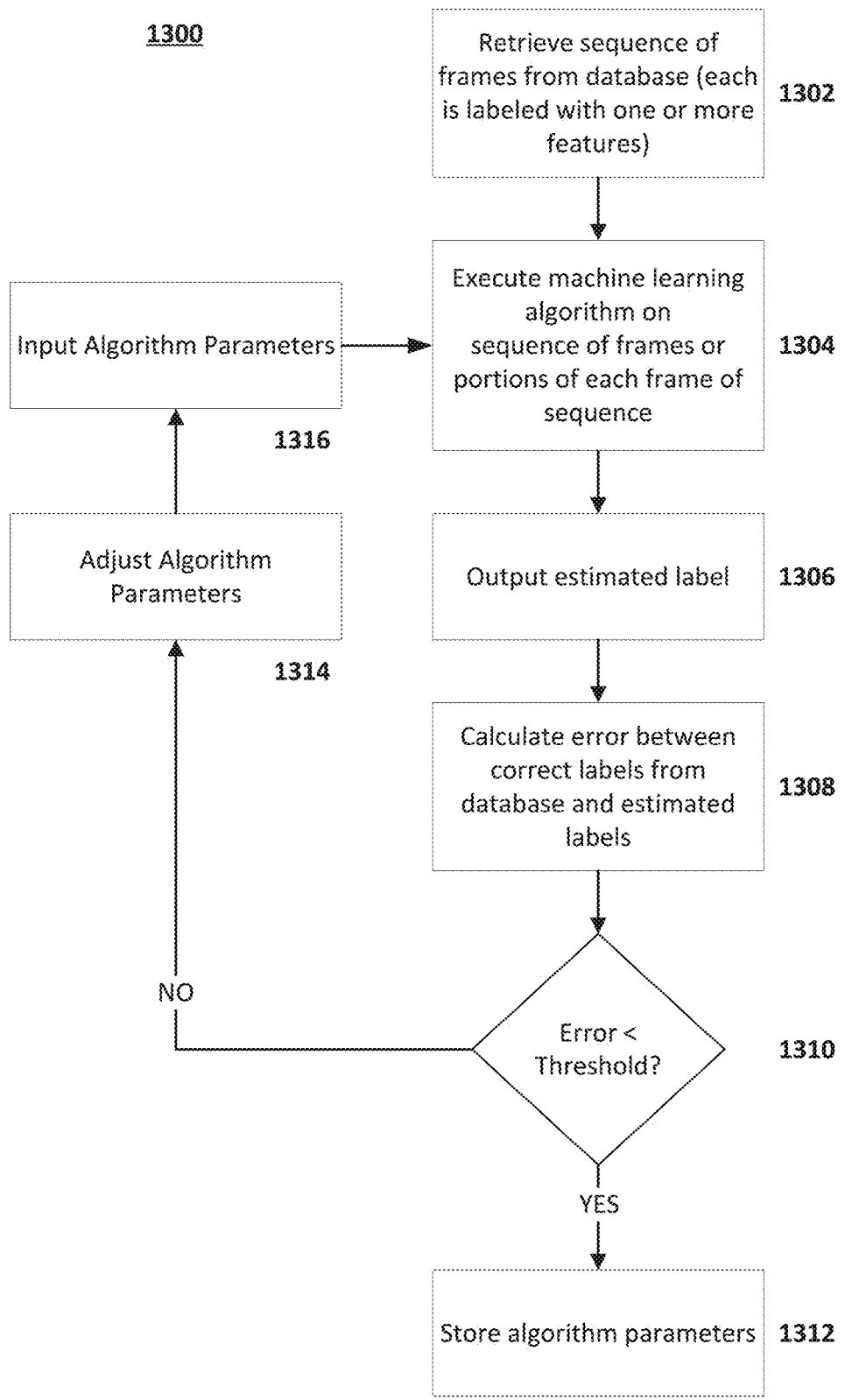
FIG. 13A is a process flow diagram for determining algorithm parameters to provide feature extraction from captured images in accordance with embodiments of the present disclosure.

FIG. 13A is a process flow diagram 1300 for determining algorithm parameters to provide feature extraction from captured images in accordance with embodiments of the present disclosure. At the outset, a plurality of sequences of frames can be stored and assigned at least one label. The label corresponds to a feature associated to the sequence of frames, e.g. a specific gesture. The prerecorded sequence of frames is stored with a label, and is retrieved and inputted into the machine learning algorithm (1302). The machine learning algorithm can operate on the sequence of frames (or, in embodiments, on a subset of pixels from each frame of the sequence of frames) (1304) using the algorithm parameters (1316).

The machine learning algorithm processes each prerecorded sequence of frames and tries to extract the feature associated with the sequence of frames, and outputs an estimated label corresponding to the feature (1306). The training includes determining an error between the correct label that is associated with the stored sequence of frames and the estimated label determined by the algorithm (1308). If the error is high (e.g., error>threshold), then the algorithm parameters can be adjusted (1314), and the adjusted algorithm parameters are used by the machine learning algorithm to provide a revised estimated label (1316, 1304). The parameters of the machine learning algorithm are adjusted iteratively (1314) until the error between the predicted labels and the actual labels of the image series of frame in the database are below a certain threshold (1310).

The algorithm parameters can include parameters such as filters or interpolation parameters, but can also include camera control parameters, such as illumination power, SNR for each captured frame, etc.

If the error<threshold, then the estimated label output form the machine learning sufficiently matches the correct label from the stored sequence of frames, and the algorithm parameters used for the machine learning are stored for use by the camera (1312). Put differently, if the error<threshold, then the machine learning has sufficiently recognized the feature (e.g., gesture) from the sequence of frames.

Figure 13B:
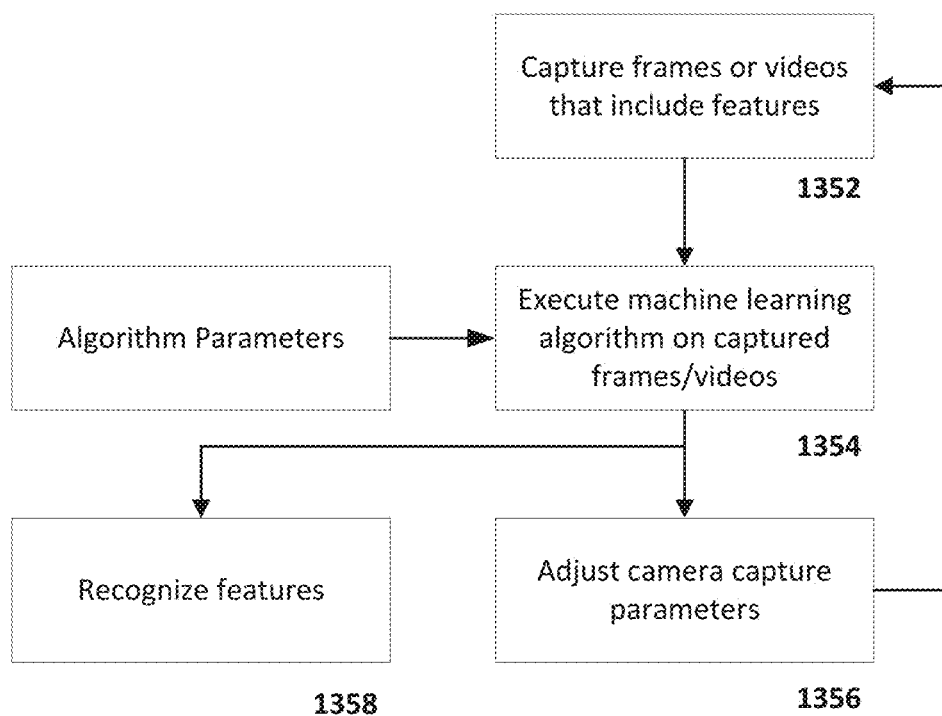
FIG. 13B is a process flow diagram for feature extraction from a set of frames captured by an imaging system in accordance with embodiments of the present disclosure.

FIG. 13B is a process flow diagram 1350 for feature extraction from a set of frames captured by an imaging system in accordance with embodiments of the present disclosure. The imaging system can capture frames or videos that include one or more features (1352). The imaging system can execute machine learning on the captured frames/videos using the stored machine learning parameters from FIG. 13A (1354). The imaging system can use the machine learning to recognize features (1358). In some embodiments, the machine learning can output one or more camera parameter adjustments to adjust the image capture quality (resulting in higher accuracy of the machine learning algorithm) (1356). The adjustments are provided to the imaging system, which can use the new camera parameters to capture new frames.

In embodiments, the captured frames include RBG and depth images, which can be used for feature extraction (for example gesture recognition) using machine learning.

Guided Filtering for Depth Sensing

Obtaining reliable depth measurements by minimizing the number of pulses can have benefits, such as reducing power, allowing more TOF cameras to be used simultaneously, allowing faster acquisition of depth images, allowing for faster frame rates, etc.

In this section, a technique for acquiring depth images using an edge preserving low-pass filter adapted for depth estimation is described. Such a filter is useful for removing noise from a depth map obtained in a low power setting. A bilateral filter can be used, for example, though a typical bilateral filter can require high computational resources.

This disclosure describes a filter type known as the "guided filter" that can be used for edge preservation for noise filtration of a depth map. Such a guided filter can be referred to as a "depth aware guided filtering" in this disclosure, though other filters can also be used without deviating from the scope of the disclosure, such as bilateral filters adapted or used in accordance with embodiments of the present disclosure. Generally, this disclosure describes holding constant certain parameters of the filter for each of the S0 and S1 sets of pixels captured for depth imaging. The filtering can reduce noise in low power images on each component of the depth image (S0 and S1), which allows for the use of low power in the form of a reduced number of pulses for image capture.

Before describing the "depth aware guided filters", the traditional guided filters are described in this section for sake of completeness and clarity. The following summarizes an example guided filtering technique:

Let:

W be a N×N region of pixels in a current patch of a single image (RGB, depth or otherwise) to be filtered;

$p_{ij}$ be the original pixel values in the current patch;

a, b be coefficients that will be computed for the center pixel in the current patch, where a can be considered an indication of the variance of the pixel values in the region (for example, close to an edge the variance may be large), and referred to herein as a scale coefficient. The coefficient b can be considered as an indication of the average of pixel values in the region (for example, b may be close to each pixel value in a flat region.). The coefficients (a, b) may be different for each N×N region.

A is a regularizing constant that is common for all patches of our image to be filtered;

The filtered pixels are represented as $\hat{p}_{ij} = ap_{ij} + b$. The coefficients can be found by solving the following optimization problem:

$$(a,b) = \arg\min_{a,b} \Sigma_{i,j \in w}(p_{ij} - ap_{ij} - b)^2 + \lambda a^2$$

This edge preserving filter is effective when the λ parameter is appropriately chosen. For example, increasing λ can result in smoother images, but with blurrier edges; whereas, decreasing λ can result in sharper edges, but less suppression of noise. A value for λ can be selected to balance the competing interests. When the underlying patch of pixels, W, is visually smooth, it can be expected that a≈0 and b≈$\bar{p}$, where $\bar{p}$ refers to the average taken over the pixel values in the patch of pixels (also referred to as a window), W. Alternatively, when the underlying patch is not smooth and/or has high variance (e.g. when there is an edge), expect a≈1 and b≈0. This optimization equation can be solved exactly, resulting in the following equation for a and b:

$$\begin{bmatrix} a \\ b \end{bmatrix} = \begin{bmatrix} \sum_{i,j \in w} p_{ij}^2 + \lambda & \sum_{i,j \in w} p_{ij} \\ \sum_{i,j \in w} p_{ij} & N^2 \end{bmatrix}^{-1} \begin{bmatrix} \sum_{i,j \in w} p_{ij}^2 \\ \sum_{i,j \in w} p_{ij} \end{bmatrix}$$

The image can be filtered by sliding the N×N window throughout the image to obtain different image patches and compute a and b for each pixel centered in the patch. As a further post-processing step, the collective values of a and b for each pixel, which can be treated as two images themselves, may be further filtered using a N×N box averaging kernel. The output of this process are two 2D signals, A and B, which are composed of filtered values of a and b, respectively.

If the original image is represented as I, then the output of the guided filter is $$\hat{I} = A*I + B$$

The multiplications and additions above are elementwise.

Depth Aware Guided Filters:

Recall that in some embodiments, depth maps obtained using TOF cameras may be obtained using two images, denoted S0 and S1. One computation of the depth map, denoted as D, is proportional to $$D \sim \frac{S1}{S1 + S0}.$$

This disclosure describes applying the guided filter to S0 and S1. In doing so, one issue that can arise is the introduction of artifacts near edges. If a values around edges differ in S0 and S1, the depth estimates around edges will be distorted. The edges in S0 and S1 overlap, and this overlap can be enforced mathematically by constraining the scale coefficient "a" to be the same for the same image patch in S0 and S1 to minimize potential artifacts. The coefficient "b" can be allowed to vary between S0 and S1 since the edges are more directly affected by "a." One approach to ensure the binding of "a" for the same patch in S0 and S1 is to choose the parameters as follows:

$$(a, b_0, b_1) = \arg\min_{a, b_0, b_1} \Sigma_{i,j \in w}(S0 - aS0 - b_0)^2 + (S1 - aS1 - b_1)^2 + \lambda a^2,$$

where $b_0$ is the coefficient b for S0 and $b_1$ is the coefficient b for S1. This problem can be solved in a similar manner as in the guided filter case where the matrix in the matrix equation will be 3×3 instead of 2×2 because of the additional "b" parameter.

By applying a guided filter to S0 and S1 and holding the coefficient "a" constant for each corresponding pixel window between the filtering processes for S0 and S1, S0 and S1 can be captured using low power techniques, such as using fewer laser pulses (e.g., 500 laser pulses, as opposed to 4000).

Figure 14:
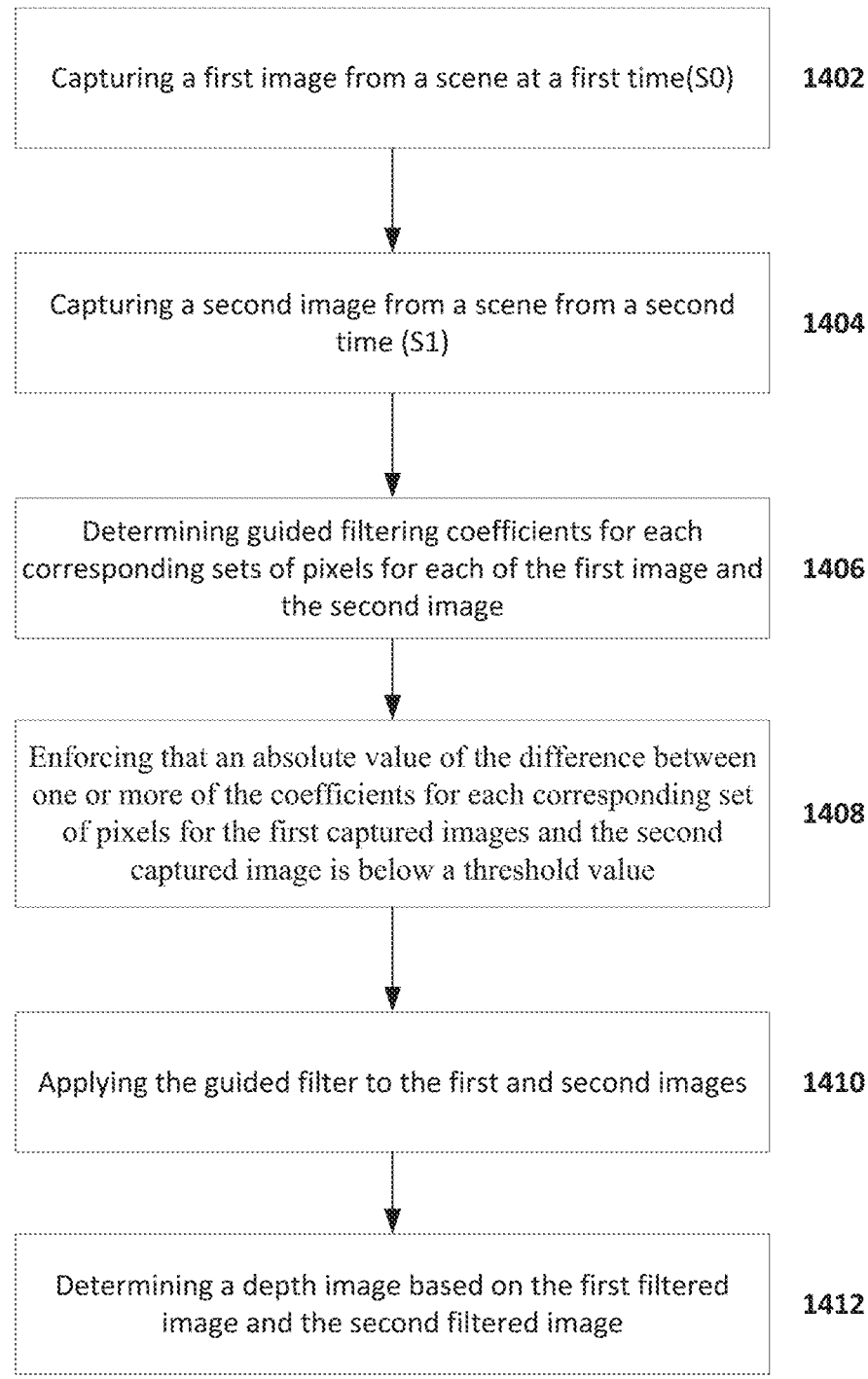
FIG. 14 is a process flow diagram for filtering low power depth images in accordance with embodiments of the present disclosure.

FIG. 14 is a process flow diagram 1400 for filtering low power depth images in accordance with embodiments of the present disclosure. A first image can be captured at a first time period (S0) (1402). A second image can be captured at a second time period different from the first time period (S1) (1404). S0 and S1 can be captured in a manner similar to that described above, such as in FIGS. 4-5.

A set of filtering coefficients can be determined for each pixel window (i.e., a set of pixel values) from one of the captured images (1406). For example, the coefficients can be determined using an N×N window of pixels (a set of pixels) for each S0 and S1, using the equation:

$$(a, b_0, b_1) = \arg\min_{a, b_0, b_1} \Sigma_{i,j \in w}(S0 - aS0 - b_0)^2 + (S1 - aS1 - b_1)^2 + \lambda a^2.$$

A guided filter can be applied to each pixel of S0 using the bound "a" coefficient (1408). For example, $\widehat{S0}_{ij} = aS0_{ij} + b0$. The guided filter can be applied to each pixel of S1 using the same bound coefficient "a" (1410). For example, $\widehat{S1}_g = aS1_{ij} + b1$. The improved depth image can be determined based on a ratio of S1^ to S0^ (1412).

The guided filtering process described above can be performed using hardware processing, software algorithms, or a combination of hardware and software to achieve real-time depth estimations.

In some embodiments, a scale coefficient for each of the first image S0 and second image S1. The absolute value of the difference between one or more of the coefficients can be enforced for each corresponding set of pixels for the first captured images and the second captured image is below a threshold value:

$$(a_0, a_1, b_0, b_1) = \arg\min_{a, b_0, b_1} \Sigma_{i,j \in w}(S0 - a_0 S0 - b_0)^2 + (S1 - a_1 S1 - b_1)^2 + A_0(a_0)^2 + A_1(a_1)^2 + a(a_0 - a_1)^2,$$

where $\alpha$ is a cost coefficient for the scale coefficient $a_0$ and $a_1$.

Passive Depth Determination

Computer vision techniques can be used for passive depth determination. Passive depth determination implies obtaining depth information in some frames even though a direct (or "active") depth determination is not performed, for example, to save power. Computer vision techniques can first segment out the rigid bodies in the image. Using 2D images and optimization, the techniques described herein can be used to estimate the motion of the rigid bodies in three dimensions so that the depth estimate can be extrapolated from a depth map given at frame 1 instead of taking a new depth image.

In this section, an algorithm is described that enables the updating of depth images in a sequence of frames by tracking objects undergoing translation without having to continuously turn on the laser. It is assumed that the objects for which the depths are desired are already known in the scene. This procedure allows for the estimation of how the depths of each object changes given an initial depth measurement that is obtained using nominal laser power and a series of "cheaply acquired" images. These "cheaply acquired" images could be RGB images acquired using a digital camera or an IR image acquired in a low power setting.

In the first scenario, the object is assumed to be rigid, which implies that all parts of the object moves in the same way (i.e. the object does not contract, expand, twist, etc.). In a second scenario, each point that makes up the object can move in its own way.

Let:

I(x, y, t) be the image. The coordinates x and y represent the pixel in the image, for example the pixel in the second row and third column would have x=2 and y=3. Time t represents the frame number, and I(x,y,t) the intensity at each pixel. I will be shorthand;

f be the focal length of the camera;

X, Y, Z be the real-world coordinates;

U, V, W be the real-world velocity in X, Y, Z, respectively;

x, y be the pixel-wise coordinates. These coordinates are known with respect to the camera origin;

u, v be the pixel-wise velocity in x and y, respectively; this is also known as "optical flow."

In implementations of the embodiments, an initial depth map, a series of low power or RGB images, and the focal length can be given; i.e., Z, the coordinates x, y, and f, respectively, are known. Z is given for each pixel, for example if Z=2 meters for x=2 and y=3, this means that the light captured in the pixel in the second row, third column of the imaging device comes from a part of an object that is 2 meters away.

To obtain some of the remaining variables, a perspective projection as shown below can be used.

$$X = Z\frac{x}{f}, Y = Z\frac{y}{f}$$

The algorithm described herein can be used to recover U, V, and W (and by extension, u and v). The relationship between U, V, and W and u and v is shown below, which is obtained through differentiation with respect to time.

$$u = f\left(\frac{U}{Z} - \frac{XW}{Z^2}\right) = f\frac{U}{Z} - \frac{xW}{Z}, v = f\left(\frac{V}{Z} - \frac{YW}{Z^2}\right) = f\frac{V}{Z} - \frac{yW}{Z}$$

The basis of the algorithm described herein is the brightness constancy assumption. The brightness constancy assumptions state that pixels undergoing small translations over small periods of time do not change in intensity. Mathematically, this can be represented below.

Let subscripts x, y, t represent partial derivatives with respect to those variables $$uI_x + vI_y + I_t = 0$$

Rewrite u and v in terms of U, V, W $$\left(f\frac{U}{Z} - \frac{xW}{Z}\right)I_x + \left(f\frac{V}{Z} - \frac{yW}{Z}\right)I_y + I_t = 0$$

Rearranging terms, the equation below can be referred to as Equation A.

$$fI_xU+fI_yV-(xI_x+yI_y)W+ZI_t=0$$

Rigid Body Translation

Rigid body translation can be computed to determine how a known body in an image has changed position. Such information can be used to update depth maps without relying on acquiring further high-cost depth estimations (high-cost implying high power, laser-based depth maps). As described in the previous section, rigid body motion means that all the points that compose an object move with the same displacement vector. Again, it is assumed that the object for which the depth information is desired is already known in the image.

Assumptions and Notation:

R is the region in the image undergoing rigid body translation;

U, V, W is the constant for all points R;

Z is obtained from a previous depth map measurement;

To find the rigid body translation, we find the U, V and W such that we satisfy equation [00166] for all pixels in region R as much as possible, in a least squares sense. This is equivalent to minimizing the following objective function J(U,V,W):

$$J(U,V,W)=\iint_{(x,y)\in R}(fI_xU+fI_yV-(xI_x-yI_y)W+ZI_t)^2 dx dy \text{ quation J(U,V,W))};$$

The solution to minimizing J(U,V,W) is as follows:

$$\begin{bmatrix} U \\ V \\ W \end{bmatrix} = \begin{bmatrix} \vdots & \vdots & \vdots \\ fI_x & fI_y & -(xI_x - yI_y) \\ \vdots & \vdots & \vdots \end{bmatrix}^+ \begin{bmatrix} \vdots \\ -ZI_t \\ \vdots \end{bmatrix}.$$

The equation gives the three-dimensional velocity of the object, which can be used to update the depth map. The assumption of a rigid body means that U, V and W, the velocity of the object, are the same for all the pixels in the object, therefore they do not depend on the coordinates x,y of the pixels. Equation J(U,V,W) takes in the depth map Z from an initial depth frame, uses the brightness constancy assumption and minimizes Equation J(U,V,W) to obtain the velocity U,V,W of the rigid object.

The estimated depth map for frame t+1 is obtained as followed: take a pixel (x,y) at frame t, with associated real world depth Z. Its real world X and Y coordinates are obtained from:

$$X = Z\frac{x}{f}, Y = Z\frac{y}{f}.$$

Now given the velocities U, V, and W, the position at frame t+1 of the part of the object that was obtained at pixel (x,y) at frame t, which can be referred to as X', Y', Z' are obtained as follows: X'=X+U, Y'=Y+V, Z'=Z+W (where we normalize time steps to be 1 between frames). Once again, using $$X = Z\frac{x}{f}, Y = Z\frac{y}{f}$$

the pixel position (x',y') can be estimated in frame t+1 that this corresponds to: (X+U)=(Z+W)x'/f, (Y+V)=(Z+W)y'/f. In these equations the only unknowns are x' and y' which can therefore be extracted. Thus in frame t+1 the pixel at position (x',y') has depth Z+W. If (x',y') are not integer, (x',y') can be rounded to the nearest integers to fill in the depth map at that pixel.

FIG. 15 is a process flow diagram 1500 for updating a depth map through rigid body translation information in accordance with embodiments of the present disclosure. At the outset, one or more rigid bodies are identified for the rigid body translation algorithm (1502). The initial depth map (e.g., a high-power depth map captured previously, such as in Frame 1), a series of images, and the focal length can be given; i.e., Z, the coordinates x, y, and f are known. Rigid bodies in the image can be segmented out to the pixel-wise location of the rigid body in x and y (1504) One or more low power images of the scene can be captured (1506). For example, one or more images of the scene can be captured using a RGB camera or a camera using a low-power IR source. The one or more images can be analyzed using the technique described above to determine translation of the rigid body between a starting point from the initial high-power image and at least one of the low power images (1508). The initial depth map can be updated using the rigid body translation information (1510).

Pixel-Wise Estimation of Translation

This section describes updating a depth map using pixel-wise estimation of motion. Note that the determination of U, V, and W for a single pixel using Equation A is an under-determined problem because several triplets of (U, V, W) values will satisfy Equation A without any additional constraints, where in the rigid body motion case, the required additional constraint came from the fact that all pixels move with the same U, V, W. In order to constrain Equation A for a reasonable solution, one approach is to impose "smoothness" on U, V, and W. The development of this approach is shown below.

For the simplicity of derivation, it is assumed that the pixel-wise velocities u and v are known (i.e., optical flow is known);

U, V, and W are 2D functions;

$\lambda$ is a constant;

Z is assumed to have been obtained from a previous depth map measurement;

Define $$S=U_x^2+U_y^2+V_x^2+V_y^2+W_x^2+W_y^2$$

and $$H(U, V, W) = \iint_{(x,y)\in R} \left(f\frac{U}{Z} - \frac{xW}{Z} - u\right)^2 + \left(f\frac{V}{Z} - \frac{yW}{Z} - v\right)^2 + \lambda S \, dxdy$$

where S and H are intermediate functions for determining coordinates U, V.

Denoting F as the integrand, the Lagrange-Euler Equation with respect to each variable is:

$$\frac{\partial F}{\partial U} - \frac{\partial}{\partial x}\frac{\partial F}{\partial U_x} - \frac{\partial}{\partial y}\frac{\partial F}{\partial U_y} = 0$$

$$\frac{\partial F}{\partial V} - \frac{\partial}{\partial x}\frac{\partial F}{\partial V_x} - \frac{\partial}{\partial y}\frac{\partial F}{\partial V_y} = 0$$

$$\frac{\partial F}{\partial W} - \frac{\partial}{\partial x}\frac{\partial F}{\partial W_x} - \frac{\partial}{\partial y}\frac{\partial F}{\partial W_y} = 0$$

Omitting the algebra, the following are example derivations:

$$\frac{f^2}{z^2}U - \frac{fx}{Z^2}W - \frac{f}{Z}u - \lambda(U_{xx} + U_{yy}) = 0$$

$$\frac{f^2}{z^2}V - \frac{fy}{Z^2}W - \frac{f}{Z}u - \lambda(V_{xx} + V_{yy}) = 0$$

$$-\frac{xf}{z^2}U - \frac{yf}{Z^2}V + \frac{x^2+y^2}{Z^2}W + \frac{xu+yu}{Z} - \lambda(W_{xx} + W_{yy}) = 0$$

Coordinates for U, V, and W are omitted whenever possible to avoid clutter, but these equations are true for each pixel. Furthermore, observe that the Lagrange-Euler equations involves the Laplacian of U, V, and W. For an image, one such approximation of the Laplacian is:

$$W_{xx} + W_{yy} = \kappa \overline{W} - \kappa W$$

where $$\overline{W}_{ij} = \frac{1}{12}W_{i-1,j-1} + \frac{1}{6}W_{i,j-1} + \frac{1}{12}W_{i+1,j-1} + \frac{1}{6}W_{i-1,j} + \frac{1}{6}W_{i+1,j} + \frac{1}{12}W_{i-1,j+1} + \frac{1}{6}W_{i,j+1} + \frac{1}{12}W_{i+1,j+1}$$

$$\kappa = 3$$

This derivation thus far suggests an iterative scheme. For each point:

$$\begin{bmatrix} U^{t+1} \\ V^{t+1} \\ W^{t+1} \end{bmatrix} = \begin{bmatrix} \frac{f^2}{Z^2} + \lambda\kappa & 0 & -\frac{fx}{Z^2} \\ 0 & \frac{f^2}{Z^2} + \lambda\kappa & -\frac{fy}{Z^2} \\ -\frac{fx}{Z^2} & -\frac{fy}{Z^2} & \frac{x^2+y^2}{Z^2} + \lambda\kappa \end{bmatrix}^{+} \begin{bmatrix} \lambda\kappa\overline{U}^t + \frac{f}{Z}u \\ \lambda\kappa\overline{V}^t + \frac{f}{z}v \\ \lambda\kappa\overline{W}^t - \frac{xu+yv}{Z} \end{bmatrix}$$

The relative motion of each pixel can be used to update the depth estimation.

Figure 16:
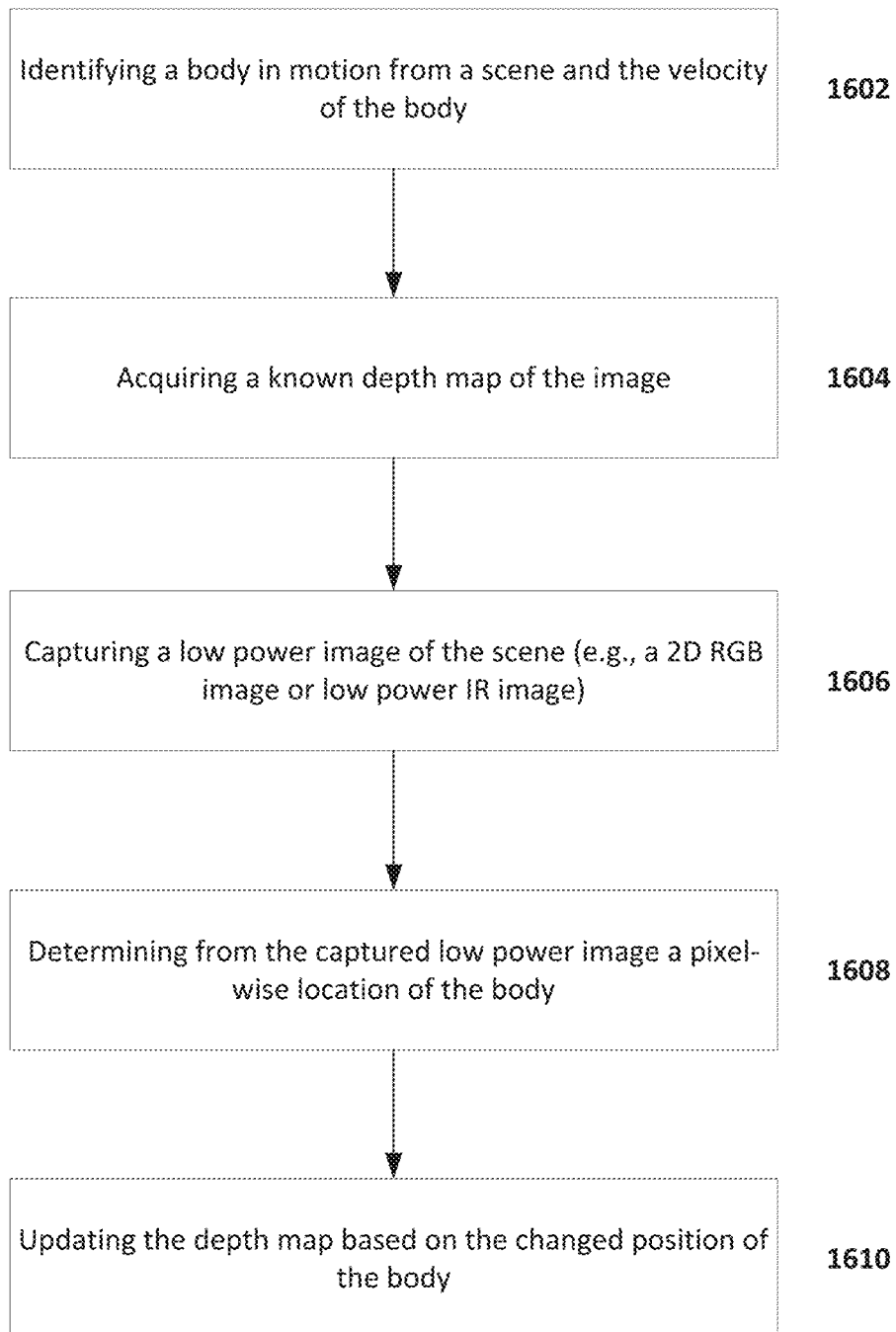
FIG. 16 is a process flow diagram for determining pixel-wise translation of an image to update a depth map in accordance with embodiments of the present disclosure

FIG. 16 is a process flow diagram 1600 for determining pixel-wise translation of an image to update a depth map in accordance with embodiments of the present disclosure. At the outset, a body in motion can be known and the bodies velocity can be known (1602). A known depth map of the image can be identified, or if now previously captured, a depth map can be captured using a high-power depth estimation technique (1604). One or more low power image of the scene (e.g., a 2D RGB image or low power IR image) can be captured (1606). A pixel-wise location of the body can be estimated or calculated e.g., using the algorithms described above (1608). The depth map can be updated using the pixel-wise calculation of the change in position of the body (1610).

Frame Interpolation Using Inertia Measuring Units (IMUs)

Figure 17:
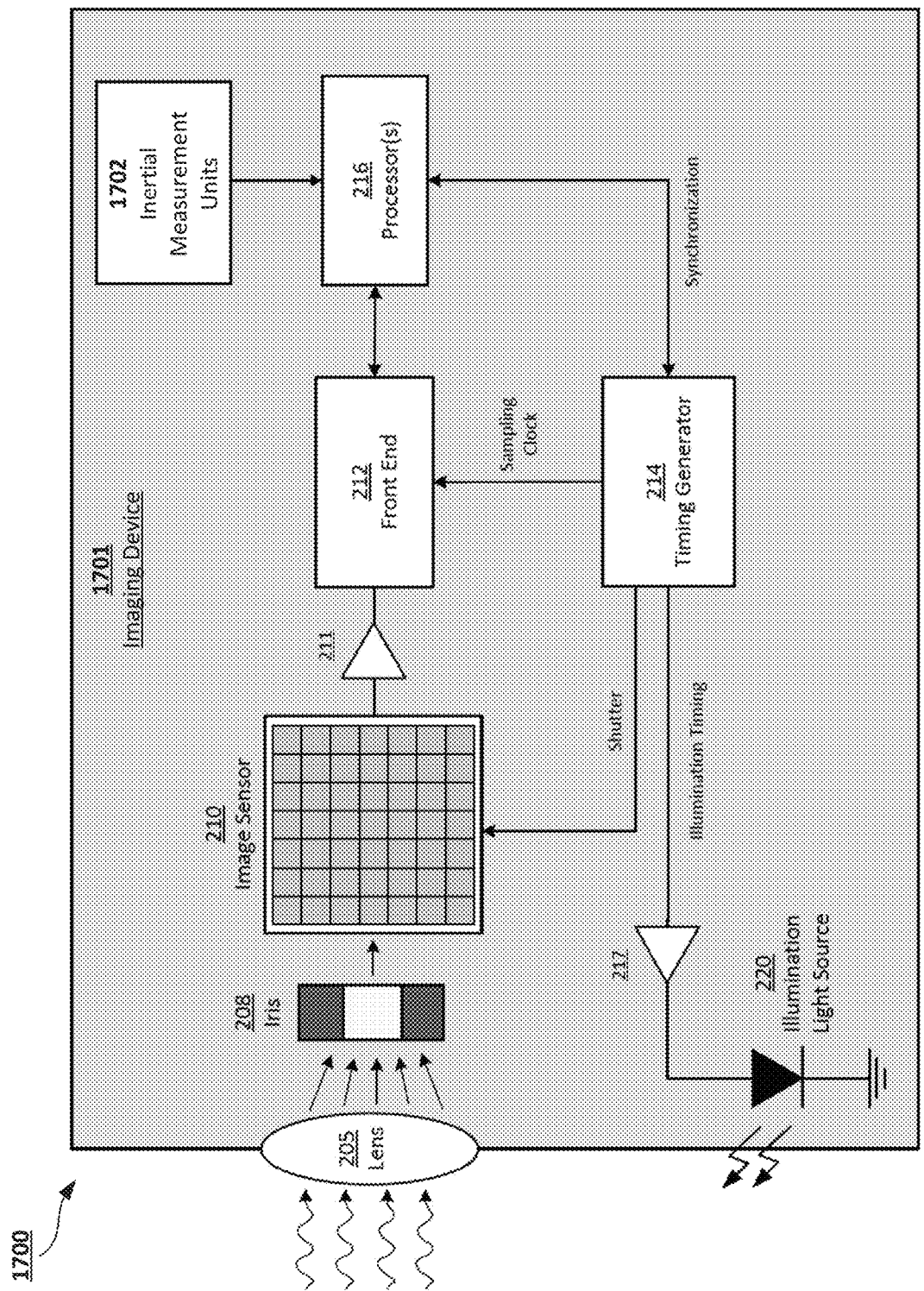
FIG. 17 is a block diagram of an imaging device with inertia measuring units (IMUs), according to some embodiments.

FIG. 17 is a schematic diagram of a sensing system 1700 that includes a Time-of-Flight (ToF) imaging device 1701, further equipped with inertia measuring units (IMUs) 1702, including accelerometer, gyroscope in accordance of some embodiment. The sensing system 1700 is similar to system 200. The IMUs 1702 provide the information on the motion of the ToF imaging device 1701, such as translational acceleration and rotational motion. The information provided by IMUs can be used to estimate the motion of the ToF imaging device 1701 with the onboard processor(s) 216.

In accordance with some embodiments of the ToF imaging device 1701 with frame decimation scheme to reduce the laser emission power, the depth maps in the decimated frames are interpolated from the measured depth maps of the ToF imaging device 1701 and RGB image or other light sensitive device captured during the decimated frames. The interpolation procedure involves computationally complex algorithms to segment images and interpolation the depth maps of each segment by interpolating the motion of these segments relative to the ToF imaging device 1701.

Figure 18A:
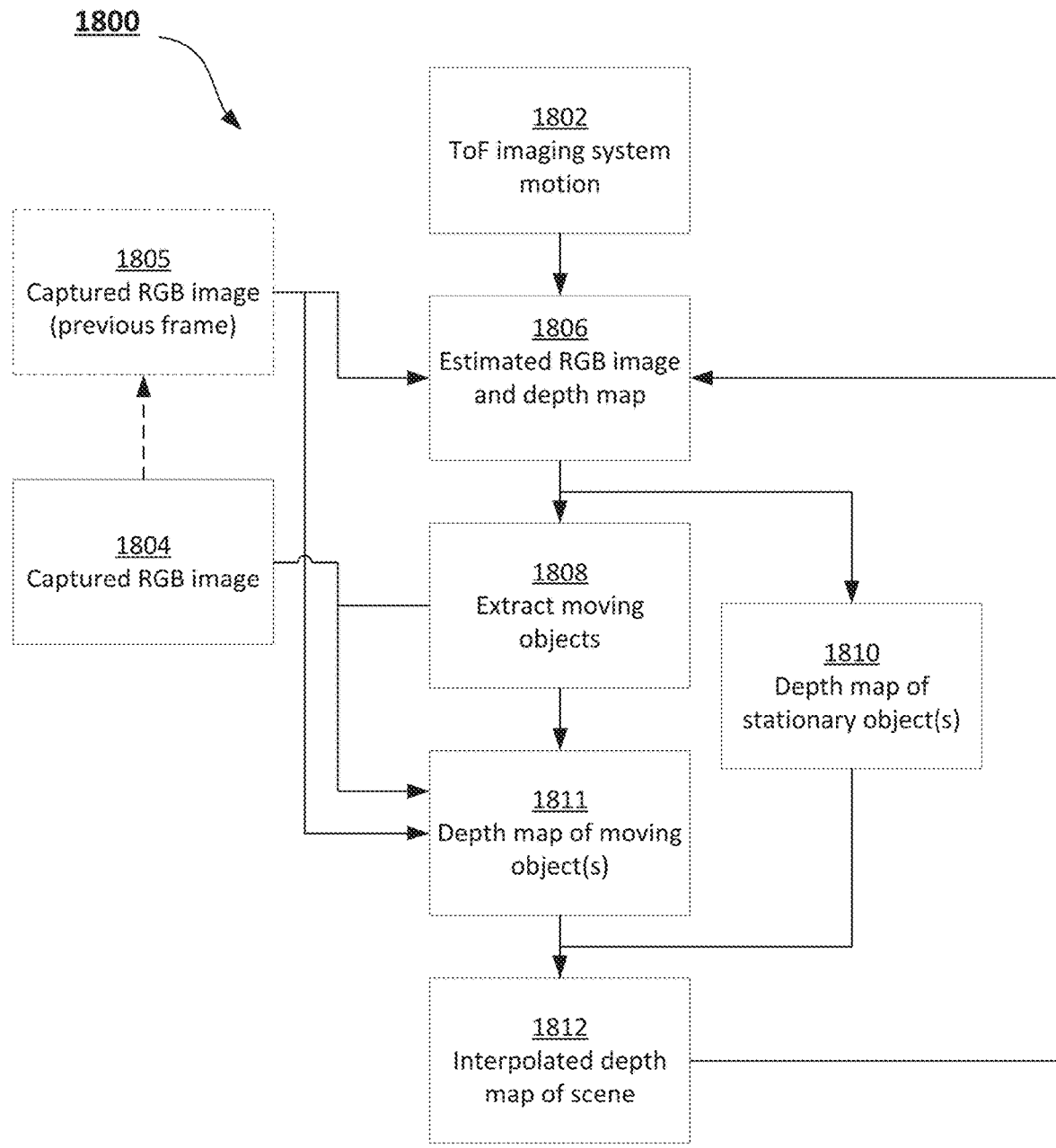
FIG. 18A is a process flow diagram for updating a depth map using IMU measurement data combining with depth map estimation using RGB images.

FIG. 18A is an embodiment of the procedure to interpolate the depth maps of the scene combining the interpolated depth maps of the stationary objects obtained using the motion information of the ToF imaging device 1701 and depth map interpolation of moving objects using RGB images. The motion of the ToF imaging device 1701 can be determined by processing data received from one or more inertia measurement units (1802). The estimated RGB frame with corresponding depth map 1806 was computed efficiently based on the previous RGB frame 1805 and the corresponding depth map from the previous frame 1814. The estimated RGB frame is then compared with the RGB image captured in the current frame 1804 and the moving objects 1808 and the depth map of the stationary objects 1810 can be identified and extracted from the scene. The depth map for the moving objects 1812 are estimated based on the RGB images of the current frame 1804 and previous frame 1805 using data driven algorithms in accordance with some embodiments. An interpolated depth map of the entire scene of current frame 1814 is produced by combining the depth maps of moving objects 1812 and stationary objects 1810.

The IMU can be used to assist in estimation translation, rotation, and rescaling vectors between a first 2D image and a second 2D image. For example, an IMU can provide accurate information that pertains to how the image sensor has moved relative to objects in a scene. This movement information can be used for determining translation, rotation, and/or rescaling of patches of pixels between two 2D captured images.

Figure 18B:
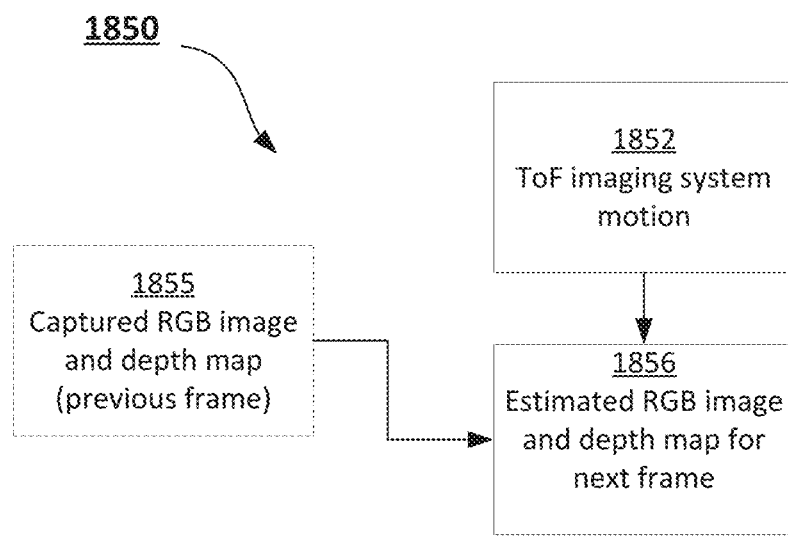
FIG. 18B is a process flow diagram for estimating a depth map using inertial measurement unit information in accordance with embodiments of the present disclosure.

FIG. 18B is a process flow diagram 1850 for estimating a depth map using inertial measurement unit information in accordance with embodiments of the present disclosure. At the outset, an imaging system, such as imaging system 1701, can collect IMU information as the imaging system is moving (1852). In a previous frame, the imaging system can capture a two-dimensional image, such as an RGB image, and a depth map of the scene (1855). The imaging system 1701 can use the IMU information and the previously captured two-dimensional image and depth map to estimate a new two-dimensional image and/or depth map for a next frame (1856). The IMU can provide information, such as transformation information, about how one or more objects in the scene may have changed between frames.

Patch-Wise Evaluation of Body Motion

Figure 19:
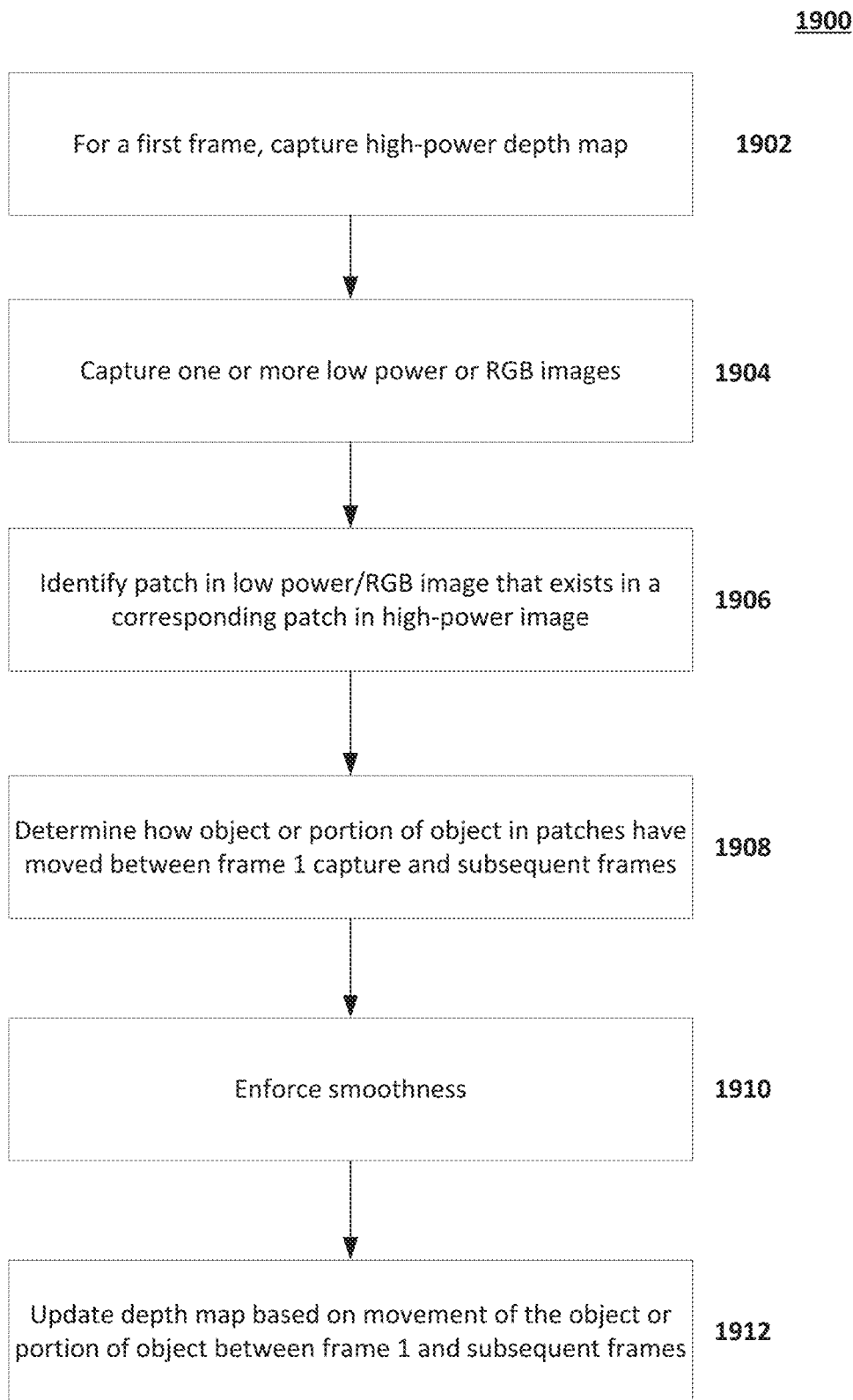
FIG. 19 is a process flow diagram for updating a depth map using a patch-wise estimation of motion of a body in accordance with embodiments of the present disclosure.

FIG. 19 is a process flow diagram 1900 for updating a depth map using a patch-wise estimation of motion of a body in accordance with embodiments of the present disclosure. At the outset, a first frame (frame 1) is captured, which can be a high-power capture for creating a depth map (i.e., using a high-power depth estimation technique) (1902). In one or more later frames captured by low power or 2D RGB techniques (1904), where depth is unknown or noisy, one or more patches (or pixel windows) of the image can be evaluated to find a corresponding patch that also exists in frame 1 (1906). E.g., a corresponding patch can include an object or portion of an object that exists in each frame. The patch from the low-power/RGB image can be compared with patches in the vicinity of this patch, possibly of different size, in the high-power images to estimate how much the object or portion of object moved (translated), changed size (rescaled), and/or rotated (1908). The comparison can be carried out using a metric, such a sum of the differences of pixel values, where large values correspond to a large disparity, and one is looking for a patch with the smallest disparity. In embodiments, smoothness of the transformations between neighboring patches can be enforced (1910).

Depth can be estimated by determining how an object or portion of object or other region of interest has changed between two images (1912). For example, if the patch is bigger, then the object is closer to the camera than it was in frame. In embodiments, the change in size or other motion can be quantified to estimate a change in depth. In addition, the use of rotation estimation capabilities can assist in the identification of a patch (or grouping of pixels) between two images. After a corresponding patch of pixels is identified in a second image, translation and rescaling (and rotation in some embodiments) can be used for depth estimation purposes.

Examples of algorithms for identifying a change of pixel locations, rescaling, and/or rotation between images include variants of optical flow, block matching, patchmatch, fast Fourier transforms, etc.

In some embodiments, algorithms described herein can benefit from data-driven approaches to increase reliability. A large set of images can be collected including a highly accurate depth map obtained with a high pulse count and one or more lower power or 2D RGB images. Data-driven algorithms, such as neural networks, Support Vector Machines, can be trained to increase the accuracy and/or speed. Such data-driven algorithms can be applied to real-time image processing techniques to enhance low-power depth map updates. For example, one can collect large datasets including depth maps to learn a comparison metric to compare patches.

As an example of using a change in patch location, scaling, or rotation, a first 2D image can be captured as well as a depth map or depth estimation of objects in the first 2D image. A second 2D image can then be captured. From the first 2D image, a patch of pixels adjacent to and proximate to pixel (x,y) is identified and assigned to pixel (x,y) in the first 2D image. The number of pixels that form a patch can be selected based on a desired resolution, power consumption, processor utilization, etc. A depth map of each patch of pixels for the first 2D image can be determined using, e.g., the captured depth map of the entire image. A depth of a pixel from the first 2D image can be represented by F(x,y), where F(x,y) represents a depth for the pixel at location (x,y).

The change in position, scaling, or rotation of the patch can be determined, e.g., using one or more algorithms described above. In this example, it can be determined that the patch of pixels has undergone rescaling and translation. The translation of the pixels can be represented by T=(x'−x, y'−y), where (x',y') represents a new pixel location for corresponding pixels in the second 2D image. The rescaling can be represented by a factor α. A new depth of a pixel in the second 2D image can be represented by:

$$G(x',y')=(1/\alpha)*F(x,y)=(1/\alpha)*F((x',y')-T),$$

where G(x',y') is the estimated depth for each pixel at location (x',y') for the second 2D image.

In embodiments, the depth estimation can be performed for each pixel of the second 2D image. In embodiments, a change in the depth of a pixel (x,y) between the first and second 2D images can be used as a representative change in the depth for a patch pixels assigned to pixel (x,y). For example, the pixel at (x',y') from the second 2D image can be estimated to be at depth G(x',y'), which differs from the depth of the pixel at (x,y) in the first 2D image by the quantity A=G(x',y')−F(x,y). If it is assumed that the pixels in each patch move in similar way between the first 2D image and the second 2D image, then the depth of the pixels in the patch assigned to pixel (x',y') in the second 2D image will also differ by quantity A. Put differently, the depth of the pixels in the patch assigned to pixel (x'y') will be the depth of the pixels in patch assigned to pixel (x,y) in the first image with A added.

In embodiments, T and/or α can be kept constant for each pixel forming an entire patch of pixels assigned to pixel (x,y), the depth of the patch can be estimated without estimating depth of each pixel in the patch separately.

Background Completion

While passive depth determination algorithm (both the rigid body motion and pixel-wise motion versions) can be used to monitor the depth of moving objects in a scene, the motion of those objects also uncovers regions in the background for which a prior depth measurement from a previous frame is not available. To "fill-in" these regions, possible techniques include image in-painting, block matching, etc. For example, by using block matching in a "cheaply obtained" frame, the closest matching patch to the uncovered background patch can be identified, and then use the patch located at the same region from the high quality depth map to "fill-in" the uncovered region. Our approach will use the passive depth determination algorithms alongside these "fill-in" methods to produce a complete depth map.

FIG. 20 is a process flow diagram 2000 for extrapolating background pixels for an updated depth map. The imaging system can identify pixels for which the method of extrapolating the depth map will not give a correct depth estimate (2002). For example, as an object or portion of an object moves from a first image to a second image, whatever was concealed by the object is revealed. Because the object was blocking an area of the background, the depth of the concealed background was not part of the initial depth map. The pixels representing the background are revealed in the second image, but the depth is not known. Those pixels can be identified for background completion.

The imaging system can locate regions in the image with a correct depth estimate that can be used to estimate the depth for the newly revealed pixels (2004). The background completion described above can be used to estimate depth based on regions of the image where depth is correctly estimated (2006).

In embodiments, the imaging device can take measurements from a scene using the imaging sensor. The term "measurements" can include capturing two-dimensional images and depth images (e.g., depth information that can be used to construct a depth map). The term "two dimensional images" includes any images that are not depth images, such as color (RGB) images, greyscale images, infrared images, other conventional images, etc.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device (which may include the foregoing examples) encoded with one or more programs that, when executed on one or more computers or other processors, implement some of the various embodiments of the present application.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be open-ended, i.e., to mean including but not limited to. The transitional phrases "consisting of" and "consisting essentially of" shall be closed or semi-closed transitional phrases, respectively.

What is claimed is:

1. A method of operating an imaging device comprising:
   capturing, during a first frame of a plurality of frames, a first set of measurements from a scene using a first power setting, the first set of measurements comprising a depth map representing a distance between at least one object in the scene and the imaging device;
   capturing, during a second frame, a second set of measurements from the scene using a second power setting, the second power setting lower than the first power setting;
   identifying, in the second frame, a second pixel window;
   identifying, in the first frame, a first pixel window wherein the first pixel window corresponds to the second pixel window and includes a corresponding first subset of the depth map;
   determining at least one of movement, rescaling, and rotation of at least a portion of an object from the first pixel window to the second pixel window, based, at least in part, on the first subset of the depth map; and
   updating the depth map captured during the first frame to predict a second depth map for the second frame, based, at least in part, on the second set of measurements and the determination of the at least one of movement, rescaling, and rotation.

2. The method of claim 1, wherein the depth map is a first depth map, and wherein the second set of measurements comprises a second depth map captured at the second power setting; the method further comprising:
   updating the first depth map based, at least in part, on the second depth map.

3. The method of claim 1, wherein the first set of measurements comprises a first two-dimensional image and the second set of measurements comprises a second two-dimensional image, the method further comprising:
   identifying at least a part of the scene in the first two-dimensional image;
   determining from the second two-dimensional image a change in a transformation of the part of the scene; and
   wherein updating the depth map comprises updating the depth map based on the change in the transformation of the part of the scene.

4. The method of claim 3, wherein the change in the transformation of the part of the scene comprises one or more of a change in position, orientation, or scale.

5. The method of claim 1, further comprising determining a transformation of at least part of the scene, including
   identifying a first set of pixels representative of a part of the at least one object in the first set of measurements;
   determining a first depth of at least one pixel of the set of pixels;
   identifying a second set of pixels corresponding to the part of the at least one object in the second set of measurements;
   determining a second depth of at least one pixels of the second set of pixels.

6. The method of claim 3 wherein determining a transformation of the part of the scene comprises determining a rotation of the at least part of the scene.

7. The method of claim 6, wherein determining the rotation of the part of the scene comprises:
   applying a fast Fourier transformation to pixels in the part of the scene in the first image and in the second image;
   determining a magnitude of the two fast Fourier transforms;
   transforming the coordinates of the magnitude of the Fourier transforms to polar coordinates;

calculating a cross power spectrum of the magnitude of the two Fourier transforms in polar coordinates; and determining an angle at which the cross spectrum is maximized as the rotation angle.

8. The method of claim 6, wherein determining the rotation of the part of the scene comprises:

applying a fast Fourier transformation to pixels in the part of the scene in the first image and in the second image;

transforming at least some coordinates of the fast Fourier transformations to polar coordinates in logarithmic scale;

calculating a cross power spectrum of the fast Fourier transformations in log-polar coordinates; and determining an exponential of a translation at which the cross power spectrum is maximized as a rescale.

9. The method of claim 1, further comprising:

determining a confidence metric associated with a comparison between the first set of measurements and the second set of measurements; and capturing, during a third frame of the plurality of frames, a third set of measurements using a third power setting, the third power setting determined based on the confidence metric.

10. The method of claim 1, further comprising:

identifying pixels for which the updated depth map includes incorrect depth estimates;

finding regions in the first frame with correct depth estimates in the updated depth map; and applying a background completion procedure to the pixels with incorrect depth estimates based on the regions in the first frame with correct depth estimate.

11. The method of claim 1, further comprising:

determining at least one of position, orientation, and velocity of an image sensor by an inertial measurement unit (IMU) coupled to the image sensor; and applying a transformation implied by the IMU to the part of the scene to determine how the part of the scene has changed between the first frame and the second frame.

12. The method of claim 1, wherein determining at least one of movement, rescaling, and rotation of the portion of the object from the first pixel window to the second pixel window includes ascertaining no movement, no rescaling, and no rotation.

13. The method of claim 1, wherein the first pixel window is in a vicinity of the second pixel window.

14. The method of claim 1, wherein determining at least one of movement, rescaling, and rotation of at least a portion of the object from the first pixel window to the second pixel window includes summing differences in pixel values between the first pixel window and the second pixel window.

15. The method of claim 14, further comprising enforcing smoothness of transformations between neighboring pixel windows.

16. An imaging device comprising:

an image sensor configured to capture a first set of measurements from a scene, the first set of measurements captured during a first frame of a plurality of frames and using a first power setting, the first set of measurements comprising a depth map representing a distance between at least one object in the scene and the image sensor; and capture a second set of measurements from the scene, the second set of measurements captured during a second frame and using a second power setting; and an image processor configured to identify, in the second frame, a second pixel window;

identify, in the first frame, a first pixel window wherein the first pixel window corresponds to the second pixel window and includes a corresponding first subset of the depth map;

determine at least one of movement, rescaling, and rotation of at least a portion of an object from the first pixel window to the second pixel window, based, at least in part, on the first subset of the depth map; and update the depth map captured during the first frame to predict a second depth map for the second frame, based, at least in part, on the second set of measurements and the determination of the at least one of movement, rescaling, and rotation.

17. The imaging device of claim 16, wherein the depth map is a first depth map, and wherein the second set of measurements comprises a second depth map captured at the second power setting, and wherein the image processor is further configured to update the first map based, at least in part, on the second depth map.

18. The imaging device of claim 16, wherein the first set of measurements comprises a first two-dimensional image and the second set of measurements comprises a second two-dimensional image, and wherein the image processor is further configured to:

identify at least part of a scene in the first two-dimensional image; and determine from the second two-dimensional image a change in a transformation of the part of the scene; and wherein the image processor updates the depth map based on the change in transformation of the part of the scene.

19. The imaging device of claim 18, wherein the change in the transformation of the part of the scene comprises one or more of a change in position, orientation, or scale.

20. The imaging device of claim 16, the image processor further configured to determine a transformation of the part of the scene by:

identifying a first set of pixels representative of a part of the at least one object;

determining a depth of at least one of the first set of pixels;

identifying a second set of pixels corresponding to the part of the at least one object in the second set of measurements; and determining a second depth of at least one pixels of the second set of pixels.

21. The imaging device of claim 18, wherein the image processor is configured to determine a transformation of the at least part of the scene by determining a rotation of the part of the scene.

22. The imaging device of claim 21, wherein the image processor is configured to determine the rotation of the part of the scene by:

applying a fast Fourier transformation to pixels in the part of the scene in the first image and in the second image;

determining a magnitude of the two fast Fourier transformations;

calculating a cross power spectrum of a magnitude of the two Fourier transformations in polar coordinates;

determining an angle at which the cross power spectrum is maximized as the rotation angle.

23. The imaging device of claim 21, wherein the image processor is further configured to:

apply a fast Fourier transformation to the pixels in the at least part of the scene in the first image and in the second image;

transform at least some coordinates of the fast Fourier transforms to polar coordinates in logarithmic scale;

calculate a cross power spectrum of the fast Fourier transforms in log-polar coordinates; and determine an exponential of a translation at which the cross spectrum is maximized as a rescaling of the at least part of the scene.

24. The imaging device of claim 16, wherein the image processor is further configured to:

determine a confidence metric associated with a comparison between the first set of measurements and the second set of measurements; and wherein the imaging sensor is further configured to capture, during a third frame of the plurality of frames, a third set of measurements using a third power setting, the third power setting determined based on the confidence metric.

25. The imaging device of claim 16, wherein the image processor is further configured to:

identify pixels for which the updated depth map includes incorrect depth estimates;

find regions in the first frame with correct depth estimates in the updated depth map; and apply a background completion procedure to the pixels with incorrect depth estimates based on the regions in the first frame with correct depth estimate.

26. The imaging device of claim 16, wherein the image processor is configured to:

determine at least one of position, orientation, and velocity of the image sensor by an inertial measurement unit (IMU) coupled to the image sensor; and apply a transformation implied by the IMU to the part of the scene to determine how the part of the scene has changed between the first frame and the second frame.

27. The imaging device of claim 16, wherein the determination used by the image processor to update the depth map includes an ascertainment of at least one of no movement, no rescaling, and no rotation of the portion of the object from the first pixel window to the second pixel window.

28. A method for depth imaging comprising:

determining, using an image sensor, a first set of measurements, the first set of measurements determined using a first frame and a first power setting, the first set of measurements comprising a depth map representing a distance between at least one object and the image sensor;

determining, using the image sensor, a second set of measurements, the second set of measurements determined using a second frame and a second power setting;

identifying, in the second frame, a second pixel window;

identifying, in the first frame, a first pixel window wherein the first pixel window corresponds to the second pixel window and includes a corresponding first subset of the depth map;

determining at least one of movement, rescaling, and rotation of at least a portion of an object from the first pixel window to the second pixel window, based, at least in part, on the first subset of the depth map; and updating the depth map from the first frame to predict a second depth map for the second frame, based, at least in part, on the second set of measurements and the determination of the at least one of movement, rescaling, and rotation.

29. The method of claim 28, wherein determining at least one of movement, rescaling, and rotation of the portion of the object from the first pixel window to the second pixel window includes ascertaining no movement, no rescaling, and no rotation.

* * * * *